United States Patent [19]
Ishibashi et al.

[11] Patent Number: 5,978,015
[45] Date of Patent: *Nov. 2, 1999

[54] STEREOSCOPIC SYSTEM WITH CONVERGENCE AND DIOPTRIC POWER ADJUSTMENTS ACCORDING TO OBJECT DISTANCE

[75] Inventors: Kenji Ishibashi, Izumi; Yasumasa Sugihara, Hashimoto; Yasushi Tanijiri, Sakai, all of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/542,197

[22] Filed: Oct. 12, 1995

[30] Foreign Application Priority Data

| Oct. 13, 1994 | [JP] | Japan | 6-247463 |
| Oct. 13, 1994 | [JP] | Japan | 6-247463 |
| Oct. 17, 1994 | [JP] | Japan | 6-250258 |
| Oct. 20, 1994 | [JP] | Japan | 6-254910 |

[51] Int. Cl.$^6$ .......................... H04N 7/18; H04N 13/02; H04N 13/04
[52] U.S. Cl. ............................ 348/47; 348/51
[58] Field of Search ............... 348/42, 46, 47, 348/51, 53, 135, 139; 359/462, 464, 466, 473, 476; 396/324, 325; H04N 7/18, 13/00, 13/02, 13/04

[56] References Cited

U.S. PATENT DOCUMENTS

| 2,955,156 | 10/1960 | Heilig | 348/53 |
| 4,178,090 | 12/1979 | Marks | 396/331 |
| 4,601,574 | 7/1986 | Yamane et al. | 356/3.04 |
| 4,725,863 | 2/1988 | Dumbreck et al. | 348/46 |
| 4,751,570 | 6/1988 | Robinson | 348/47 |
| 4,818,858 | 4/1989 | Sorimachi et al. | 348/53 |
| 4,825,393 | 4/1989 | Nishiya | 348/139 |
| 5,034,809 | 7/1991 | Katoh | 348/53 |
| 5,557,454 | 9/1996 | Takahashi | 348/45 |

FOREIGN PATENT DOCUMENTS

| 0527198B1 | 2/1993 | European Pat. Off. . |
| S60-20734 | 5/1982 | Japan . |
| S62-115989 | 5/1987 | Japan . |
| S62-122493 | 6/1987 | Japan . |
| H5-52116 | 5/1991 | Japan . |
| H3-289797 | 12/1991 | Japan . |
| H5-78013 | 10/1993 | Japan . |

*Primary Examiner*—Bryan Tung
*Attorney, Agent, or Firm*—Burns, Doane, Swecker & Mathis, LLP

[57] ABSTRACT

In a stereoscopic system including a three-dimensional camera and an HMD, by setting the convergences of the three-dimensional camera and the HMD in accordance with the distance to the object to be shot, a stereoscopically viewable object distance range is increased and a natural stereoscopic image is provided. The three-dimensional camera is provided with a convergence setter which varies the directions of left and right cameras, and the HMD is provided with a convergence setter which varies the directions of left and right virtual image projectors. The distance to the object is detected based on the distance between the left and right images taken by the three-dimensional camera, and the convergence setters of the three-dimensional camera and the HMD are controlled in accordance with the detected distance. The convergence setter of the three-dimensional camera performs focusing, interlocking with the convergence setting. The convergence setter of the HMD sets the dioptric power, interlocking with the convergence setting.

12 Claims, 30 Drawing Sheets

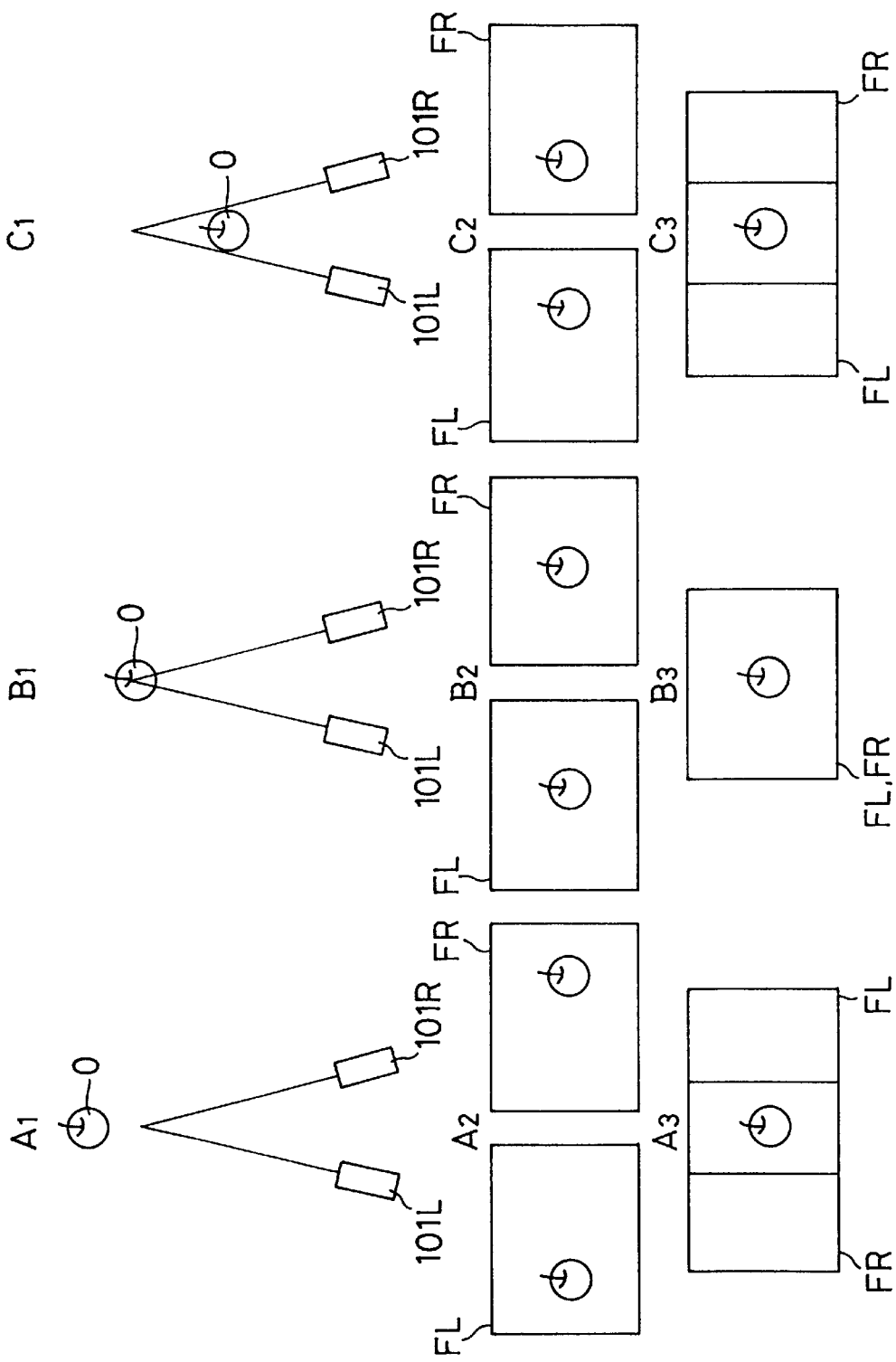

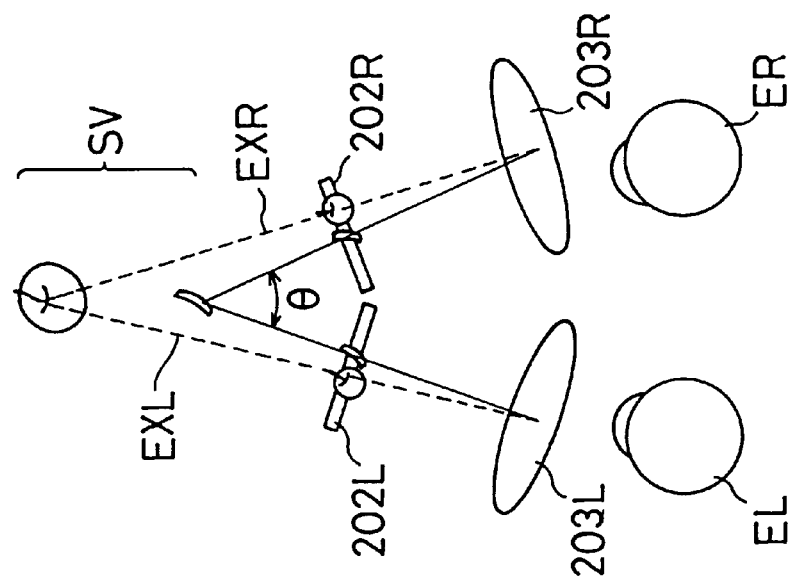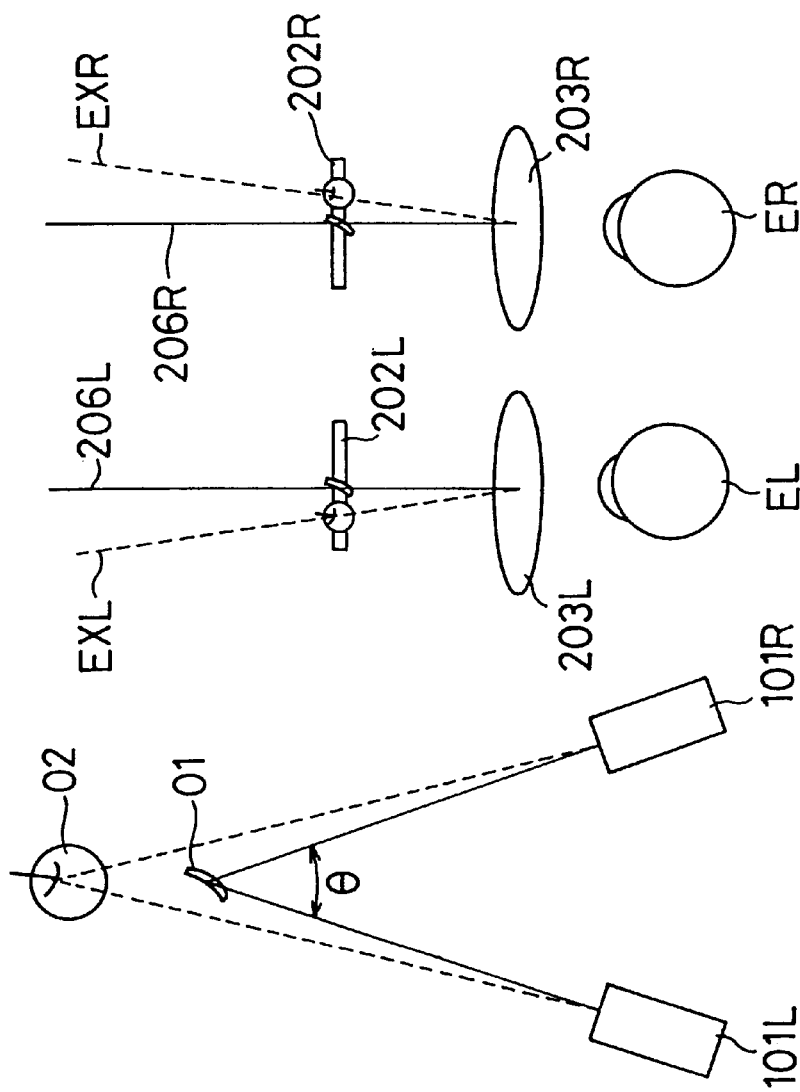

STEREOSCOPIC SYSTEM WITH CONVERGENCE AND DIOPTRIC POWER ADJUSTMENTS ACCORDING TO OBJECT DISTANCE

BACKGROUND OF THE INVENTION

1 Field of the Invention

The present invention relates to a stereoscopic system which stereoscopically displays images shot by a three-dimensional camera in a head mounted display, and more specifically, to the setting of the convergence and focus position of the camera and the setting of the convergence and dioptric power of the display.

2. Description of the Prior Art

A stereoscopic system has conventionally been known for viewing images shot by a three-dimensional camera with a three-dimensional viewing apparatus. The three-dimensional camera shoots an object with its left and right cameras to provide left and right images with parallax. The three-dimensional viewing apparatus displays the left and right images and directs them to the left and right eyes to provide a stereoscopic image of the object.

In recent years, as the three-dimensional viewing apparatus, the increased use of a head mounted display (HMD) has been remarkable. The HMD has left and right virtual image projectors each including a display and an eyepiece so that the image light of the display is directed via the eyepiece to the eye to provide the eye with a virtual image of the display image. Since the images with parallax are presented before the eye, the person wearing the HMD can easily view a stereoscopic image.

In order to view an object stereoscopically with such a stereoscopic system, it is premised that the object is shot by both of the left and right cameras. However, in a three-dimensional camera having its left and right cameras being fixed, since the shooting area common to the left and right cameras is fixed, the shootable area is limited depending on the distance to the object to be shot. When the object to be shot is sufficiently away from the three-dimensional camera, the shooting by both of the left and right cameras is possible. However, the closer the object to be shot is, the smaller the area shootable by both of the left and right cameras is, so that when the object is at a very short distance, it can be shot by one camera but cannot be shot by the other camera.

When the condition is satisfied that the object is shot by both of the left and right cameras, what is next important in the stereoscopic system is how natural the sense of stereoscopy provided by the displayed image is. The sense of stereoscopy of the displayed image depends on the following two factors: the relative directions of the left and right visual axes, i.e. convergence, which directly affect parallax; and the distance from the eye to the image, i.e. dioptric power. Therefore, it is necessary to appropriately set the convergence and dioptric power of the three-dimensional viewing apparatus in accordance with the image to be displayed. Since the image displayed in the viewing apparatus is shot by the three-dimensional camera and the parallax is determined at the time of the shooting, it is also necessary to set the convergence of the three-dimensional camera, i.e. the relative directions of optical axes of the left and right cameras in accordance with the distance to the object. Further, in order that parallax in shooting and parallax in viewing coincide with each other, it is preferable that the convergence of the three-dimensional camera and the convergence of the viewing apparatus coincide with each other. Moreover, although it is a matter of course, it is important that the focus position of the three-dimensional camera is varied according to the distance to the object in order to shoot the object clearly.

As a method to increase the stereoscopically viewable distance range, it is known to set the distance between the left and right cameras to be variable. For example, in Japanese Published Patent Application H5-52116, in a three-dimensional camera provided with left and right taking lenses and left and right image sensing devices, the left and right image sensing devices are arranged to be displaceable in the left and right direction. In the three-dimensional camera of this arrangement, when the distance to the object is short, by setting the distance between the image sensing devices to be wide, the light from the object is imaged on the left and right image sensing devices through the left and right taking lenses.

The above prior art discloses an arrangement of a three-dimensional viewing apparatus having left and right video display devices and left and right eyepieces, where the video display devices are displaceable in the left and right direction. When shooting is performed with an increased distance between the image sensing devices, by setting the distance between the left and right video display devices to be short, the convergence of the viewing apparatus can be set in accordance with the convergence of the three-dimensional camera. In the three-dimensional camera and the three-dimensional viewing apparatus of such arrangements, the range of the distance to the object at which stereoscopically viewable left and right images can be shot becomes wider and the convergence in shooting and the convergence in viewing can be set to substantially coincide with each other.

However, Japanese Published Patent Application H5-52116 discloses neither a specific mechanism to set the convergences of the three-dimensional camera and the three-dimensional viewing apparatus nor a specific method to set the convergences in accordance with the distance to the object. Moreover, the prior art makes no reference to methods to detect the difference in convergence between the camera and the viewing apparatus and to set the convergences so as to coincide with each other.

With respect to the setting of convergence and the adjustment of focus of the three-dimensional camera, for example, Japanese Laid-open Patent Application No. S62-122493 discloses to set the convergences of two cameras with respect to an object to be shot and to calculate the focus position of each camera from the set convergence to perform focusing. Japanese Published Patent Application S60-20734 discloses to perform focusing with respect to an object to be shot and to set the convergence in accordance with the set focus position. However, according to the method to calculate the focus position from the convergence, complicated calculation is necessary, and according to the method to set the convergence based on the focus position, an error in focusing is reflected in the convergence setting, so that an error is also caused in the convergence. In any of the above-described prior arts, the convergence setting and focusing are controlled independently of each other and complicated arrangements are necessary therefor.

Various arts have also been proposed with respect to the setting of the convergence and dioptric power of the viewing apparatus. For example, U.S. Pat. No. 2,955,156 discloses to view a television image with the left and right eyes through an HMD whose convergence and dioptric power are adjustable. However, these adjustments are performed not interlocking with the distance of the stereoscopic image but manually by the viewer, and the convergence and dioptric power are maintained in set conditions unless the viewer operates the HMD.

Japanese Laid-open Patent Applications Nos. S62-115989 and H3-289797 and Japanese Published Patent Application H5-78013 disclose HMDs which set the distance from the eye to the virtual image in accordance with the distance of the displayed stereoscopic image.

SUMMARY OF THE INVENTION

In order to set the convergence of a three-dimensional camera in accordance with the distance to an object to be shot, information on the distance to the object or information on the degree of deviation of the convergence of the camera set at that time from the convergence suitable for the distance to the object is necessary. In a stereoscopic system for viewing images shot by a three-dimensional camera with a three-dimensional viewing apparatus, normally, the viewer views the image at a place away from the shooting site where the three-dimensional camera is set. Therefore, in order to set the convergence of the viewing apparatus, information on the convergence setting of the three-dimensional camera or information on the distance to the object is necessary.

Further, it is preferable that the convergence setting of the three-dimensional camera and the convergence setting of the three-dimensional viewing apparatus interlock with each other so that the convergence in shooting and the convergence in viewing always coincide with each other. With the stereoscopic system thus arranged, it is always possible to view a stereoscopic image having a natural sense of stereoscopy.

In order to take a sharp image with the three-dimensional camera, it is necessary that the focus positions of the left and right cameras be appropriately set in accordance with the distance to the object to be shot. In view of the operation, the focus position setting preferably interlocks with the convergence setting of the camera. On the other hand, in the viewing apparatus, it is important to set the distance from the eye to the virtual image appropriately in accordance with the distance to the object at the time of shooting for viewing a natural stereoscopic image. It is preferable that the setting of the distance from the eye to the virtual image, i.e. the setting of the dioptric power interlocks with the setting of convergence of the viewing apparatus without any inconsistency.

An object of the present invention is to provide a stereoscopic system comprising a three-dimensional camera and an HMD where the range of the distance to the object whose image can be viewed stereoscopically is wide and the convergences of the three-dimensional camera and the HMD are set appropriately in accordance with the distance to the object.

It is a further object of the present invention to provide a stereoscopic system where the focus position of the three-dimensional camera and the dioptric power of the HMD are appropriately set in accordance with the distance to the object to reproduce a sharp and natural stereoscopic image.

To achieve the above-mentioned objects, in a stereoscopic system which comprises a shooting apparatus provided with left and right cameras each having a taking lens and an image sensing device and a video display apparatus provided with left and right video display devices and eyepieces, and displays images of an object taken by the cameras on the display devices, the following are provided: a first convergence setter which sets a convergence of the shooting apparatus; a second convergence setter which sets a convergence of the video display apparatus; a distance detector which obtains information on a distance to an object to be shot; and a controller which controls the first and second convergence setters based on the information obtained by the distance detector.

According to the stereoscopic system of this arrangement, the distance to the object to be shot is detected and the convergence of the shooting apparatus and the convergence of the video display apparatus are set based on the detected distance. Consequently, left and right images preserving natural sense of stereoscopy are taken and the left and right images are displayed without their sense of stereoscopy being deteriorated.

In the stereoscopic system of the above arrangement, the controller controls the first and second convergence setters so that the convergence of the video display apparatus coincides with the convergence of the shooting apparatus. By setting the convergence of the video display apparatus so as to coincide with the convergence of the shooting apparatus, the parallax of the displayed left and right images coincides with the parallax of the object obtained at the time of shooting, so that a natural sense of stereoscopy is reproduced.

Further, the shooting apparatus is provided with a focusing apparatus which interlocks with the convergence setting, and the video display apparatus is provided with a dioptric power adjuster which interlocks with the convergence setting. In the shooting apparatus of this arrangement, the convergence and the focus position are set in accordance with the distance to the object to be shot, so that sharp left and right images having natural sense of stereoscopy are taken. The video display apparatus has its convergence and dioptric power set in accordance with the distance to the object in shooting and displays left and right images full of sense of stereoscopy.

BRIEF DESCRIPTION OF THE DRAWINGS

These and other objects and features of this invention will become clear from the following description, taken in conjunction with the preferred embodiments with reference to the accompanied drawings in which:

FIGS. 24A to 24C show a relationship between the convergence setting of the three-dimensional camera and fusion of the left and right images;

FIGS. 25A to 25C show a relationship between the convergence settings of the three-dimensional camera and the HMD;

DESCRIPTION OF THE PREFERRED EMBODIMENTS

Figure 23:
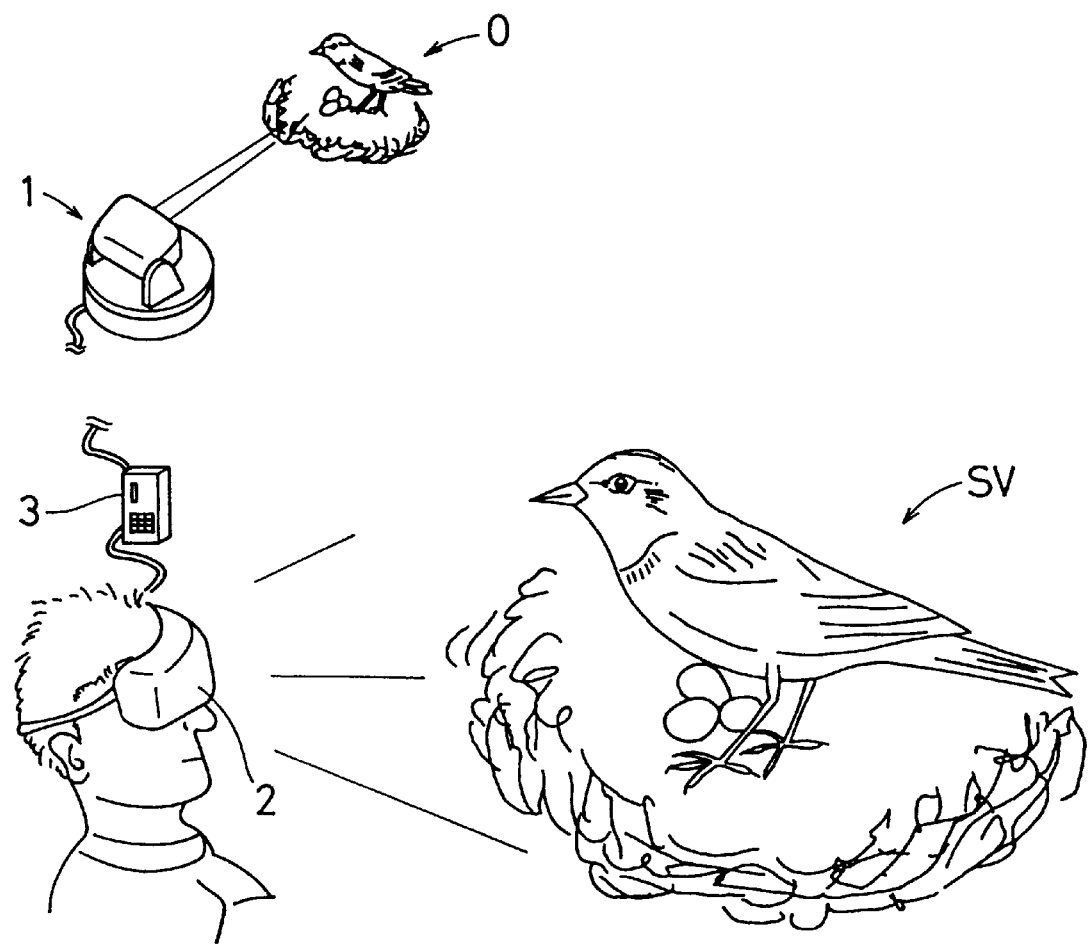
FIG. 23 shows an outline of the stereoscopic system.

Referring to FIG. 23, there is shown an outline of the stereoscopic system constituted by a combination of a three-dimensional camera and an HMD. The three-dimensional camera 1 has left and right cameras and is placed in the vicinity of an object O. The HMD 2 incorporates left and right virtual image projectors for projecting virtual images to the left and right eyes, respectively, and provides the viewer wearing the HMD 2 with a stereoscopic image SV by projecting the virtual image of an object image taken by the left camera of the three-dimensional camera 1 to the left eye and projecting the virtual image of an object image taken by the right camera to the right eye. It is unnecessary to arrange the HMD 2 close to the three-dimensional camera 1, and the HMD wearer can view the image at a place away from the shooting site. Reference numeral 3 represents a controller which controls the three-dimensional camera 1 and the HMD 2. The controller 3 is arranged close to the HMD 2 so that the HMD wearer can operate it.

To reproduce a natural stereoscopic image by taking the left and right images of an object with the three-dimensional camera 1 and displaying the left and right images with the HMD 2, it is necessary that the three-dimensional camera 1 and the HMD 2 be provided with the following characteristics of the human sight:

The human sight recognizes the sense of distance and the sense of stereoscopy based on the distance between the left and right eyes and adjustment of the refractive powers of the crystalline lenses of the eyes. Since the left and right eyes are away from each other, in viewing an object, so-called parallax is generated between the images formed on the left and right retinas. With the parallax, the relative sense of distance of the object is perceived. In viewing an object, the visual axes of the eyes point to the object, so that so-called convergence is set. The angle of the visual axes, i.e. the angle of convergence increases as the distance to the object decreases, and decreases as the distance increases. When an object at infinity is viewed, the visual axes are parallel to each other.

To form a clear image of the object on the retinas, focusing, i.e. dioptric power adjustment is made by varying the refractive powers of the crystalline lenses according to the distance to the object. The tension of the eyes necessary for the dioptric power adjustment increases as the distance to the object decreases, and decreases as the distance increases. From the degree of the tension, the distance to the object is recognized to a certain extent.

In the three-dimensional camera for taking the left and right images, it is necessary that the convergence be correctly set for the object and that the focus condition be correctly set to take clear images. The convergence setting of the three-dimensional camera will be described with reference to FIGS. 24A to 24C. In these figures, the convergences of left and right cameras 101L and 101R of the three-dimensional camera are the same but the distances from the three-dimensional camera to the object O are different as shown at A1, B1 and C1. The left and right images taken by the left and right cameras 101L and 101R in the conditions A1, B1 and C1 are as shown at A2, B2 and C2.

In the condition B1 where the optical axes of the left and right cameras 101L and 101R intersect on the object O and the convergence is appropriately set, the left and right images are located in the centers of left and right image frames FL and FR as shown at B2. When the left and right images are fused to view a stereoscopic image, the left and right image frames FL and FR coincide with each other as shown at B3. Consequently, the left and right images and the background within the image frames coincide with each other and a natural stereoscopic image is reproduced.

On the contrary, in the condition A1 where the convergence is too large, the left and right images are located on outer positions in the image frames FL and FR as shown at A2. Conversely, if the images are taken under the condition C1 where the convergence is too small, the left and right images are located on inner positions in the image frames FL and FR as shown at C2. When the left and right images shown at A2 and C2 are fused into stereoscopic images, the left and right image frames disaccord with each other as shown at A3 and C3. The disaccord between the left and right image frames gives the viewer a sense of incongruity. The incongruity increases as the deviation of the convergence increases, and the image cannot be seen stereoscopically in the end. On the other hand, if the image frames FL and FR are squared with each other when the convergence is inappropriately set, the left and right images of the object do not coincide with each other as is apparent from A2 and C2. Thus, it is difficult to view the object stereoscopically.

Thus, in order to take left and right images which enable the viewer to view a natural stereoscopic image, it is necessary that the convergence of the three-dimensional camera be appropriately set according to the distance to the object (hereinafter, referred to as object distance). When the distance between the left and right cameras is fixed, convergence is univocally determined according to the object distance. In correspondence with the setting of the convergence, focus setting is also determined univocally.

To view with an HMD the left and right images taken by the three-dimensional camera having its convergence and focusing condition appropriately set as a natural stereoscopic image, it is necessary that the convergence and the dioptric power of the HMD be appropriately set.

Figure 21:
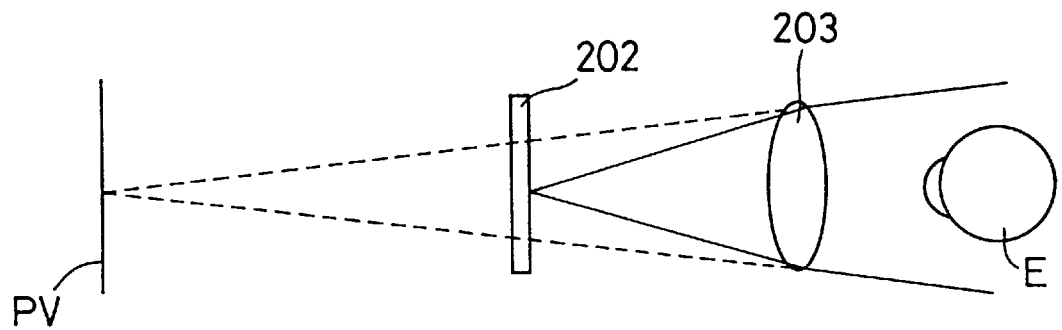
FIG. 21 shows the dioptric power of the HMD.

The HMD 2 is provided with left and right displays and left and right eyepieces comprising a convex lens as a pair of virtual image projectors. The images displayed on the displays are directed through the eyepieces to the viewer's eyes. Referring to FIG. 21, there is schematically shown the condition where the image on the display is viewed through the eyepiece. When an eyepiece 203 is set so that a display 202 is at a position between the eyepiece 203 and its front focus position, as shown in FIG. 21, the image light of the display 202 is perceived as if it were emitted from a plane PV located farther away than the display 202, so that a virtual image is obtained on the plane PV. The position of the virtual image plane PV is shifted backward and forward by moving the display 202 backward and forward with the eyepiece 203 being fixed or by moving the eyepiece 203 backward and forward with the display 202 being fixed. The dioptric power of the viewer's eye E is adjusted so that in-focus condition is obtained according to the distance to the virtual image plane PV.

Figure 22:
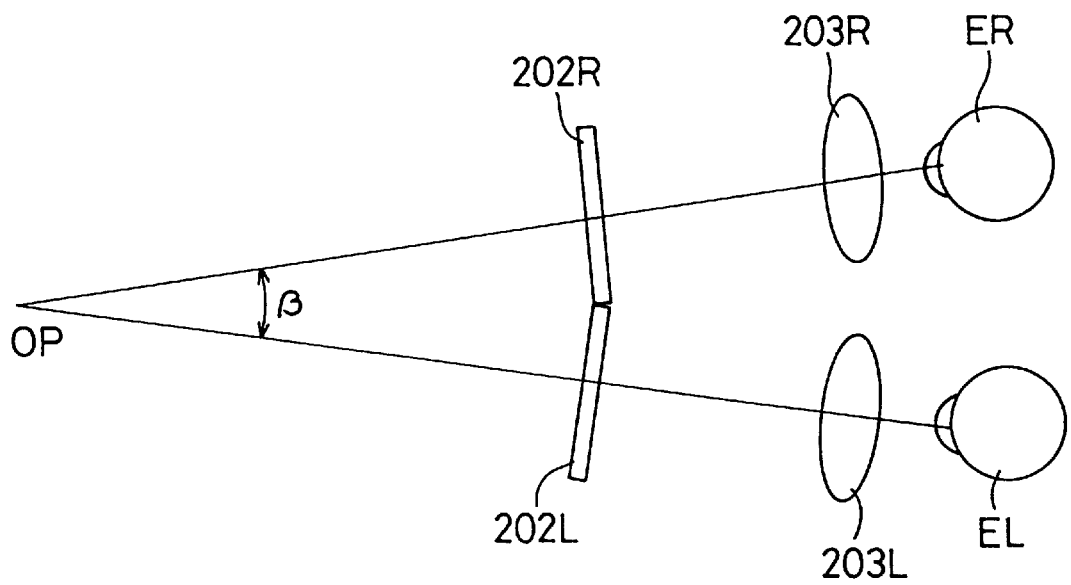
FIG. 22 shows the convergence of the HMD.

Referring to FIG. 22, there is shown a condition where images of left and right displays 202L and 202R are viewed by the both eyes EL and ER. By inclining inside the display 202L and the eyepiece 203L for the left eye and the display 203R and the eyepieces 203R for the right eye, the viewer perceives the image as if it were present at a position shown at OP in the figure. In the figure, β represents the angle of convergence. If the angle of convergence does not coincide with the angle of convergence of the three-dimensional camera in shooting, the object distance is not correctly reproduced, so that a natural stereoscopic image is not obtained.

For example, the situations as shown in FIGS. 25A to 25C will be considered. FIG. 25A shows a condition where a first object O1 is shot by the three-dimensional camera. A second object O2 is present farther away than the first object O1. The optical axes of the left and right cameras 101L and 101R intersect on the first object O1 as shown by the solid line at an angle of convergence θ. FIG. 25B shows a condition where the left and right images thus taken are viewed with an HMD having its convergence set for infinity. The left and right images of the first object O1 are located in the center of the left and right displays like B2 of FIG. 24. The left and right optical axes 206L and 206R of the HMD are parallel to each other. At this time, the left and right images of the second object O2 are displayed on the outside of optical axes 206L and 206R. In order to stereoscopically view the image of the object O2 under this condition, visual axes EXL and EXR of the left and right eyes EL and ER are necessarily turned outside. Since it is very difficult for men to cause their eyes to turn outside simultaneously, the viewer cannot view the image stereoscopically.

FIG. 25C shows a condition where the images are viewed with an HMD having its angle of convergence set at θ like the three-dimensional camera. In this case, the left and right visual axes EXL and EXR directed to the left and right images of the second object O2 incline inside and the convergence is appropriately reproduced, so that the first object O1 and the second object O2 are correctly viewed as a stereoscopic image SV. Under this condition, the object distance is correctly reproduced, so that a natural sense of distance is obtained.

Thus, it is necessary to set the convergence of the HMD to coincide with the convergence of the three-dimensional camera. In addition to the setting of convergence, by setting the distance to the virtual image PV to coincide with the distance to the intersection of the left and right visual axes for locating the left and right virtual images at the intersection of the visual axes, a more natural stereoscopic image is reproduced. Hereinafter, the setting of the distance from the eye to the virtual image plane will be referred to as the setting of dioptric power of the HMD. This setting is different from subsequently-described dioptric power correction for compensating for shortsightedness and farsightedness.

Figure 26A:
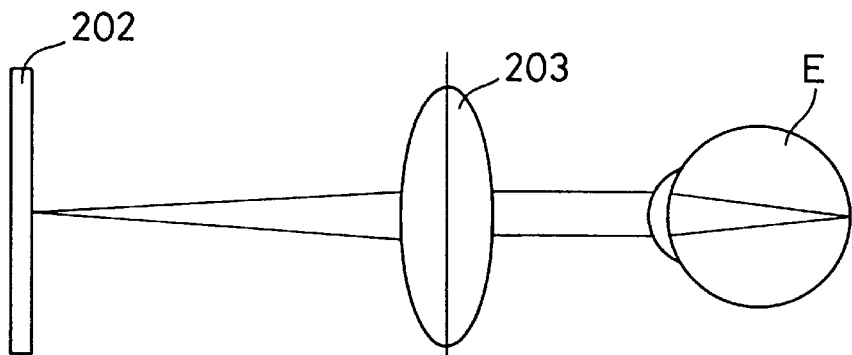
FIGS. 26A to 26C show a dioptric power correction by an HMD.

Normally, the human eye can clearly view an object located at a very short distance as well as at infinity. However, in the cases of shortsighted eyes and farsighted eyes, the refractive power adjusting function of the crystalline lenses deteriorates, so that in-focus condition cannot be obtained with respect to objects located at a long or a short distance. How the correction is made in the HMD will be described with reference to FIGS. 26A to 26C. FIG. 26A shows a manner of image formation by an emmetropia. The display 202 is located at the front focus position of the eyepiece 203. The image light is transmitted by the eyepiece 203 to be formed into parallel light and is incident on the eye E as light from infinity. In the emmetropia, the refractive power is appropriately adjusted for the parallel light and the parallel light is formed into an image on the retina.

Figure 26B:
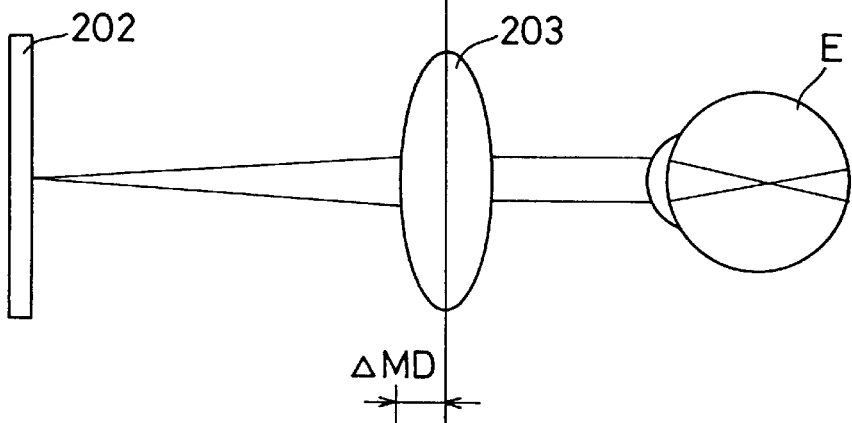
Figure 26C:
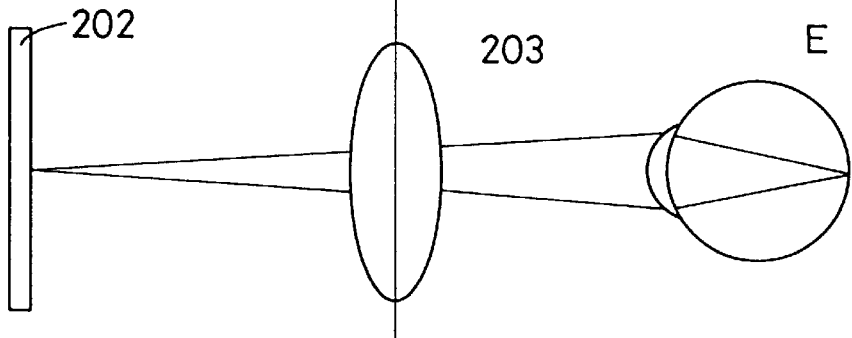

FIG. 26B shows a condition where the image is viewed by a shortsighted eye when the display 202 and the eyepiece 203 are set in the same manner. In the shortsighted eye, the refractive power cannot be adjusted for parallel light or substantially parallel light, so that the image light intersects in front of the retina. For this reason, a clear image is not formed on the retina. In this case, as shown in FIG. 26C, by moving the eyepiece 203 slightly farther away from the eye, the image light intersects on the retina. By this correction, a clear image is viewed. In the case of farsighted eyes, since the image light intersects behind the retina, the eyepiece is moved closer to the eye so that the image light intersects on the retina.

A movement distance ΔMD of the eyepiece 203 required for this correction differs according to the degree of near-sightedness or farsightedness and even differs between the left and right eyes of one viewer. For this reason, it is desirable that the HMD can correct left and right dioptric powers independently of each other. The dioptric powers can also be corrected by moving the display 202 backward or forward while the position of the eyepiece 203 is made invariable.

In the stereoscopic system of this embodiment shown in FIG. 23, the three-dimensional camera 1 and the HMD 2 are formed in consideration with the above-described characteristics of the human eye. In the three-dimensional camera 1, the settings of convergence and focus condition are variable. In the HMD 2, the settings of convergence and dioptric power are variable and correction of the dioptric power is possible. Further, the movement of the viewer's head is detected by the HMD 2 and the direction of the three-dimensional camera 1 is set following the direction of the HMD 2 to take the images of an object to which the viewer intends to pay attention. Moreover, the object distance is detected based on the left and right images taken by the three-dimensional camera 1, and according to the object distance, the convergence and focus condition of the three-dimensional camera 1 and the convergence and dioptric power of the HMD 2 are set.

Thus, in the stereoscopic system of the present invention, by interlocking the operation of the three-dimensional camera for shooting and the operation of the HMD for display, the image of an object which the viewer intends to view is taken in real time, and a clear and real stereoscopic image is provided.

Figure 1:
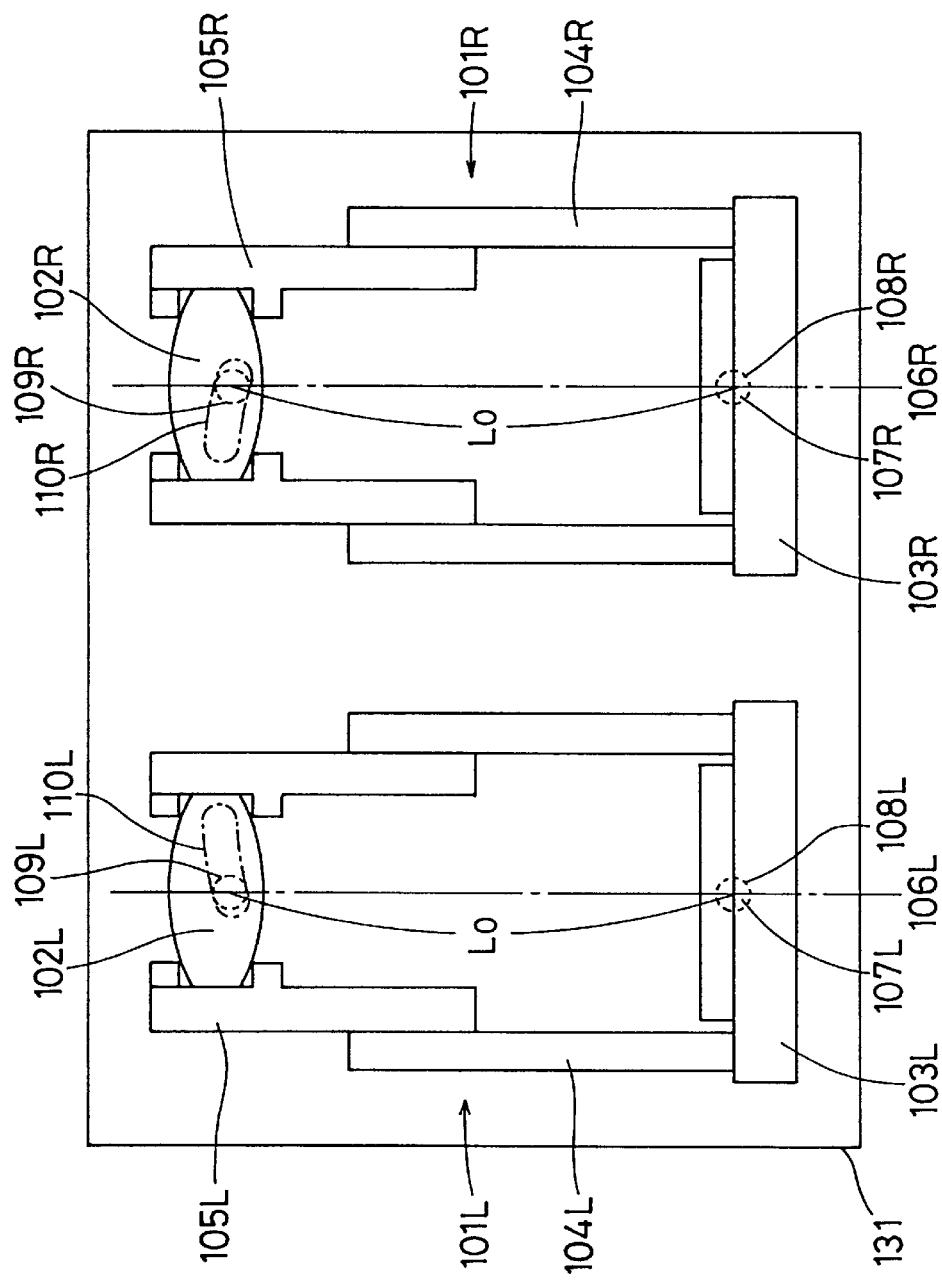
FIG. 1 is a plan view showing an arrangement of a three-dimensional camera when an object at infinity is shot.

The three-dimensional camera will be described with reference to FIGS. 1 to 8. Referring to FIG. 1, two cameras 101L and 101R are set on a board 131. The left camera 101L includes a taking lens 102L, a charge coupled device (CCD) sensor 103L, a barrel 104L and a lens holding barrel 105L. The CCD sensor 103L receives light transmitted by the taking lens 102L to convert it into an electric signal and is set to be perpendicular to an optical axis 106L of the taking lens 102L so that the optical axis 106L passes through the center of the CCD sensor 103L. The CCD sensor 103L is fixedly held by the barrel 104L. The taking lens 102L is fixedly held by the lens holding barrel 105L.

The lens holding barrel 105L is inserted into the barrel 104L to be movable along the optical axis 106L of the taking lens 102L. The left camera 101L can be focused on objects in a range from a very short distance to infinity. In FIG. 1, the camera 101L is focused on an object at infinity. A distance $L_0$ from the CCD sensor 103L to the taking lens 102L is substantially minimum within the movable range of the lens holding barrel 105L.

A pin 107L is provided on the outer surface of the barrel 104L below the center of the light receiving surface of the CCD sensor 103L. The board 131 has therein a hole 108L of a diameter slightly larger than the diameter of the pin 107L. The barrel 104L is held by the board 131 to be rotatable about the pin 107L by inserting the pin 107L into the hole 108L. A pin 109L is also provided at a lower part of the outer surface of the lens holding barrel 105L. The pin 109L engages with a cam groove 110L formed in the board 131. In accordance with the rotation of the left camera 101L, the pin 109L moves along the cam groove 110L and the lens holding barrel 105L moves along the optical axis 106L. Thus, the moving-out amount of the taking lens 102L varies in accordance with the rotation of the camera 101L.

Like the left camera 101L, the right camera 101R includes a taking lens 102R, a CCD sensor 103R, a barrel 104R, a lens holding barrel 105R, a pin 107R provided on the barrel 104R and a pin 109R provided on the lens holding barrel 105R. In the board 131, a hole 108R and a cam groove 110R are formed. The pin 107R and the pin 109R engage with the hole 108R and the cam groove 110R, respectively, so that the right camera 101R rotates about the pin 107R relative to the board 131. The base length of the three-dimensional camera 1 is the distance between the pins 107L and 107R, i.e. the distance between the centers of the left and right CCD sensors 103L and 103R. While the optical axes 106L and 106R of the left and right cameras 101L and 101R are parallel to each other in FIG. 1, the left and right cameras 101L and 101R turn inside as the object distance decreases, so that the optical axes 106L and 106R intersect.

Figure 2:
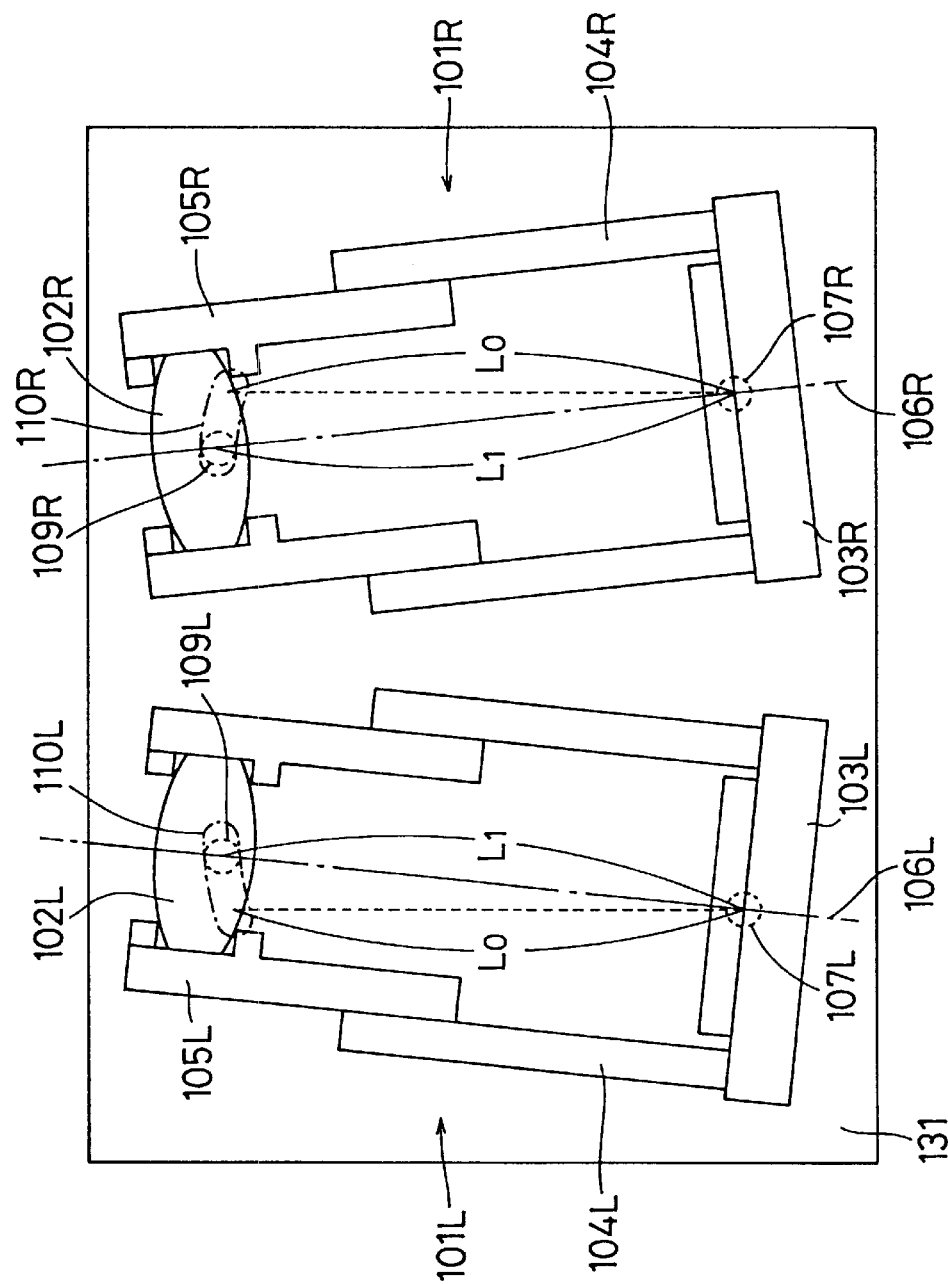
FIG. 2 is a plan view showing the arrangement of the three-dimensional camera when an object at a short distance is shot.

Referring to FIG. 2, there is shown a condition of the left and right cameras 101L and 101R in shooting an object at a short distance. The left and right cameras 101L and 101R are directed inside so that the object is located on the intersection of the optical axes 106L and 106R. The angle between the left and right optical axes 106L and 106R is the angle of convergence of the three-dimensional camera 1.

Since the pins 109L and 109R of the left and right cameras 101L and 101R engage with the cam grooves 110L and 110R, the lens holding barrels 105L and 105R are set at positions in accordance with the directions of the cameras 101L and 101R. While the distance between the CCD sensors 103L and 103R and the taking lenses 102L and 102R is $L_0$ for an object at infinity, the lenses 102L and 102R are moved out for an object at a short distance and the distance between the sensors 103L and 103R and the lenses 102L and 102R is $L_1$. That is, a difference $L_1 - L_0$ is caused in the focus position. In the three-dimensional camera 1 of the present invention, in order that appropriate focusing condition is always obtained in accordance with the object distance, the cam grooves 110L and 110R are formed in consideration with the angles of rotation of the cameras 101L and 101R and the moving-out amounts of the taking lenses 102L and 102R.

Since the pins 107L and 107R serving as the axes of rotation are provided below the centers of light receiving surfaces of the CCD sensors 103L and 103R as described above, the distance between the centers of the left and right sensors 103L and 103R, i.e. the base length is always constant and varies neither in shooting an object at a short distance nor in shooting an object at infinity.

Figure 3:
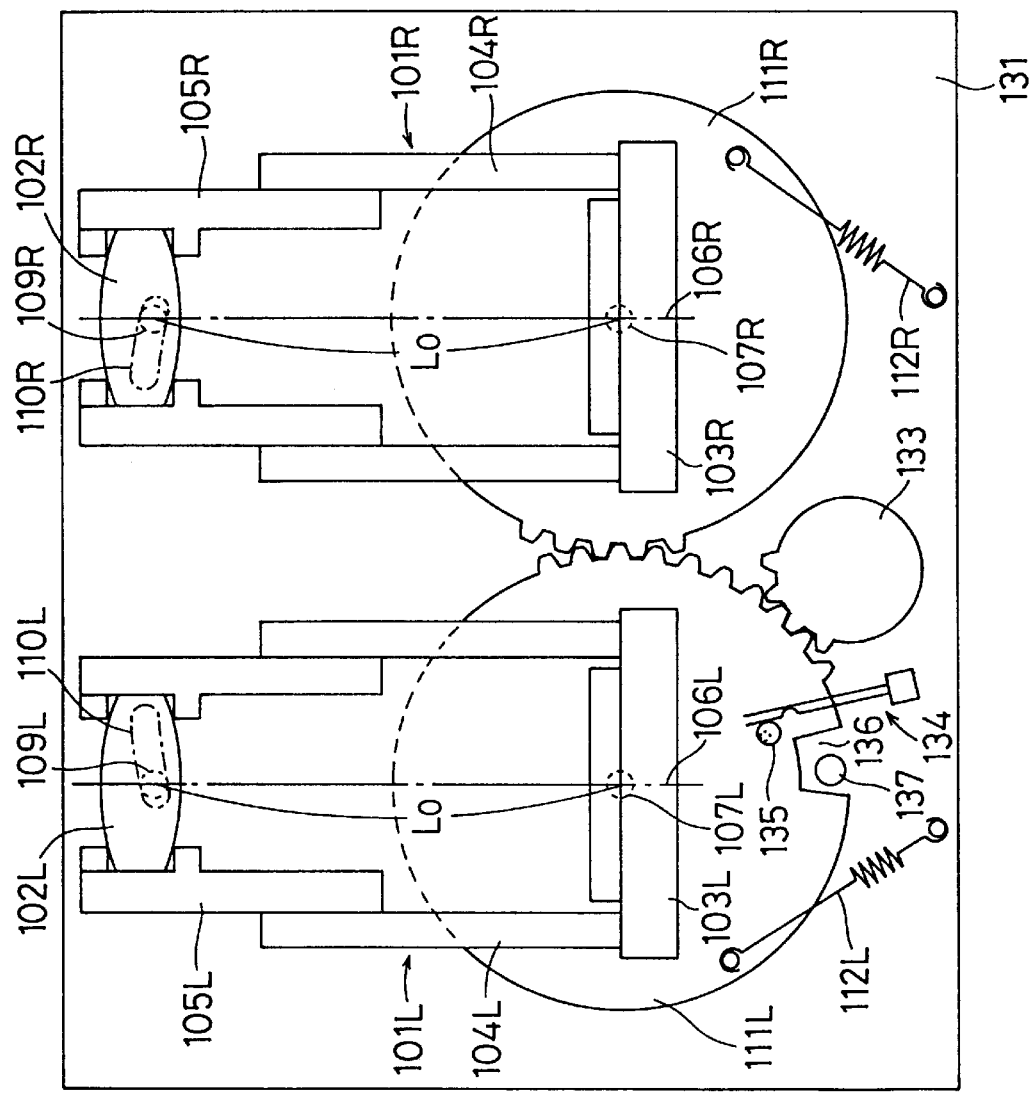
FIG. 3 is a plan view showing a convergence and focus condition setting mechanism of the three-dimensional camera when an object at infinity is shot.

Referring to FIG. 3, there is shown a convergence setting mechanism of the left and right cameras 101L and 101R. In this figure, like in FIG. 1, the left and right cameras 101L and 101R are in a condition for shooting an object at infinity. A partly toothed gear 111L is fixed to the pin 107L of the left camera 101L, and a partly toothed gear 111R is fixed to the pin 107R of the right camera 101R. The gear 111L and the gear 111R engage with each other. By the rotation of the gear 111L, the left camera 101L rotates about the pin 107L, and the right camera 101R rotates about the pin 107R in a direction opposite to the left camera 101L by the same angle. The gear 111L also engages with a gear 133 coupled to a subsequently-described stepping motor 132 not shown in FIG. 3. The rotation of the stepping motor 132 is transmitted to the left camera 101L through the gears 133 and 111L and further to the right camera 101R through the gear 111R, so that the left and right cameras 101L and 101R simultaneously rotates in the opposite directions by the same angle.

A spring 112L is provided between the gear 111L and the board 131 to pull the gear 111L counterclockwise. A spring 112R is also provided between the gear 111R and the board 131 to pull the gear 111R clockwise. Since the clearance between the teeth of the gears 111L and 111R are brought to one side by the springs 112L and 112R, no error is caused in the setting of directions of the left and right cameras 101L and 101R irrespective of the direction of rotation.

The board 131 is provided with an electric switch 134, which is closed and opened by contact with and separation from a decentered pin 135 provided on the gear 111L. The switch 134 is closed when the left camera 101L is oriented in a direction to shoot an object at infinity and is otherwise open. The opening and closing position is strictly adjusted by setting the optical axes 106L and 106R of the left and right cameras 101L and 101R to be parallel to each other under a condition where both of the terminals of the switch 134 are open and then by rotating the decentered pin 135 so that one terminal of the switch 134 pushed by the decentered pin 135 is in contact with the other terminal. The closing signal of the switch 134 is used as a signal representative of the reference positions of rotations of the left and right cameras 101L and 101R.

In order to restrict the range of rotation of the gear 111L, a recess 136 is formed in the gear 111L and a pin 137 is provided on the upper surface of the board 131 at a position corresponding to the recess 136. Thereby, a problem is prevented that the convergence is erroneously set so that the left and right cameras 101L and 101R are brought into contact with each other and damaged.

Figure 4:
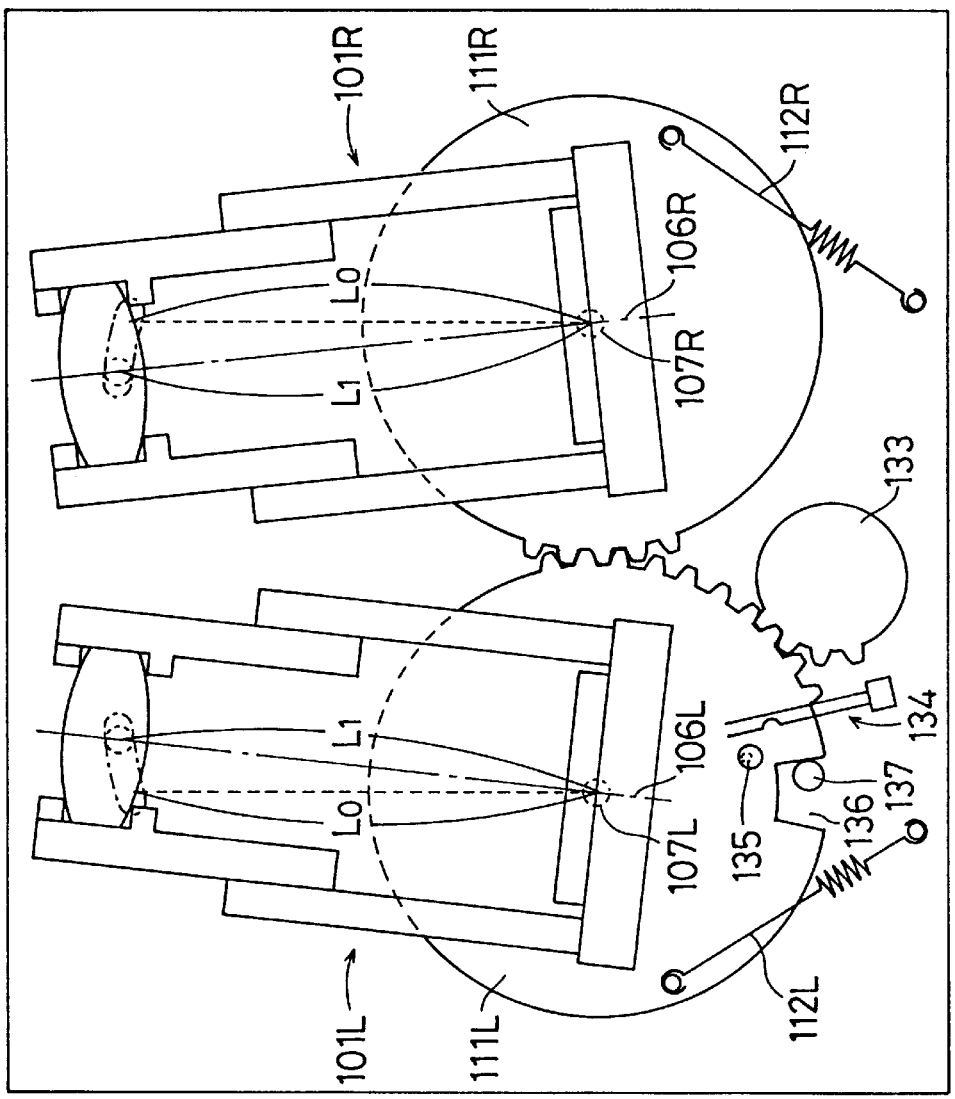
FIG. 4 is a plan view showing the convergence and focus condition setting mechanism of the three-dimensional camera when an object at short distance is shot.

Referring to FIG. 4, there is shown a condition where the convergence is set for an object at a short distance. The left and right cameras 101L and 101R are symmetrically rotated by the stepping motor 132 through the gears 133, 111L and 111R so that the object is located at the intersection of extension lines of the optical axes 106L and 106R. As described previously, the focus position is automatically set according to the setting of the convergence. At this time, the switch is open.

Figure 5:
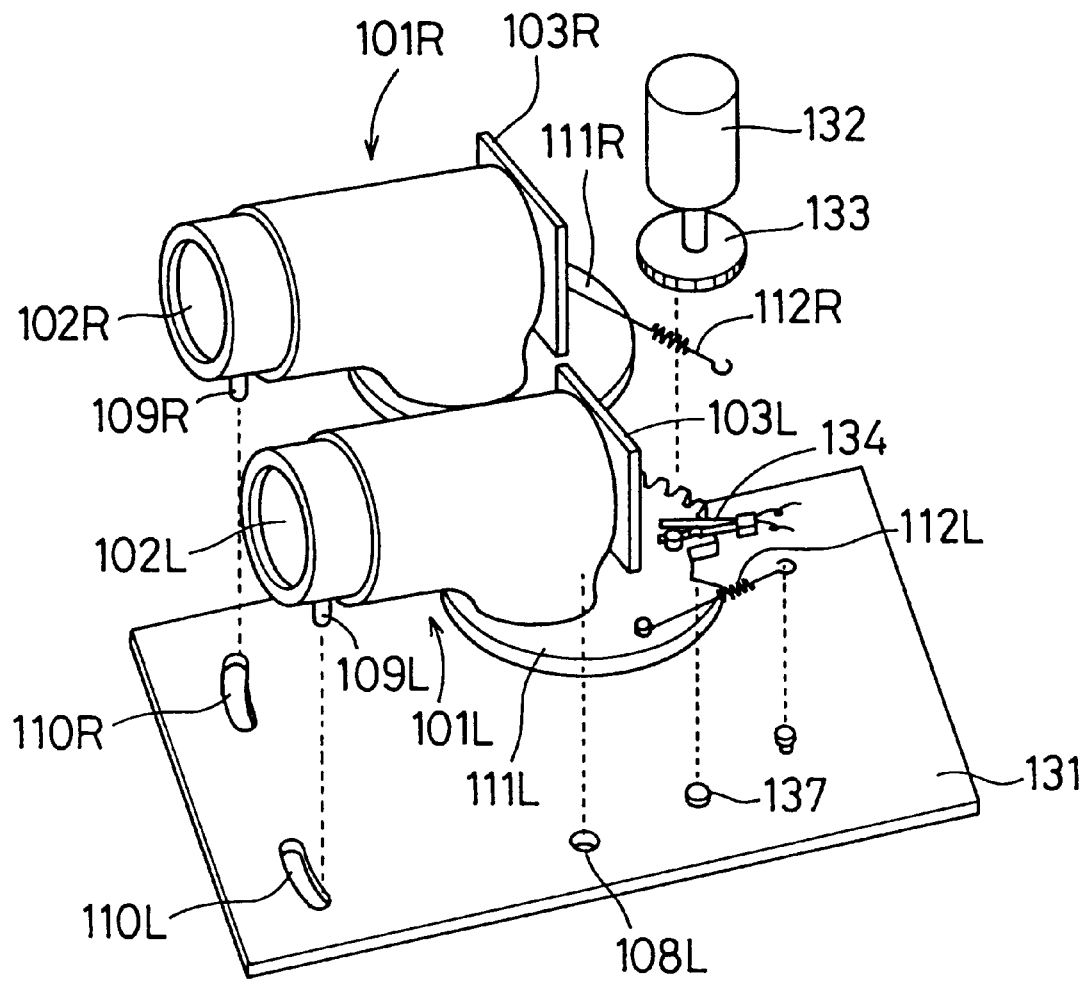
FIG. 5 is an exploded perspective view of the three-dimensional camera.

Referring to FIG. 5, there is shown the coupling of the mechanisms of the three-dimensional camera 1. The gear 133 is coupled to the stepping motor 132 and engages with the gear 111L. The pin 107L serving as the rotation axis of the left camera 101L and the gear 111L engages with the hole 108L formed in the board 131. The hole 108R serving as the rotation axis of the right camera 101R and the gear 111R is also formed in the board 131. The hole 108R is not shown in this figure. The pin 109L provided on a lower portion of the lens holding barrel 105 of the left camera 101L is inserted into the cam groove 110L and the pin 109R of the right camera 101R is inserted into the cam groove 110R.

The rotation of the stepping motor 132 is transmitted to the left and right cameras 101L and 101R through the gears 133, 111L and 111R, so that the left and right cameras 101L and 101R rotate to set the convergence. As the left and right cameras 101L and 101R rotate, the left and right pins 109L and 109R move along the cam grooves 110L and 110R, respectively, so that the moving-out of the taking lenses 102L and 102R is adjusted. Thus, focus condition is set in conjunction with the setting of the convergence.

The clearance between the teeth of the gears 111L and 11R is brought to one side by the springs 112L and 112R, and the rotation ranges of the left and right cameras 101L and 101R are restricted by the pin 137 of the board 131 and the recess 136 of the gear 111L. Further, it is judged based on the switch 134 whether the left and right cameras 101L and 101R are directed to infinity or not, i.e. whether the left and right optical axes 106L and 106R are parallel to each other or not.

In the three-dimensional camera 1 structured as described above, the convergence is set by rotating the stepping motor 132 so that the object is located on the intersection of extension lines of the optical axes 106L and 106R of the left and right cameras 101L and 101R. In the left and right cameras 101L and 101R, since the pins 109L and 109R engage with the cam grooves 110L and 110R, the moving-out amount is adjusted in conjunction with the setting of the convergence, so that focus condition is automatically set. Since the base length of the left and right cameras 101L and 101R are constant, it is always possible to take left and right images which reproduce a correct sense of distance.

Figure 6:
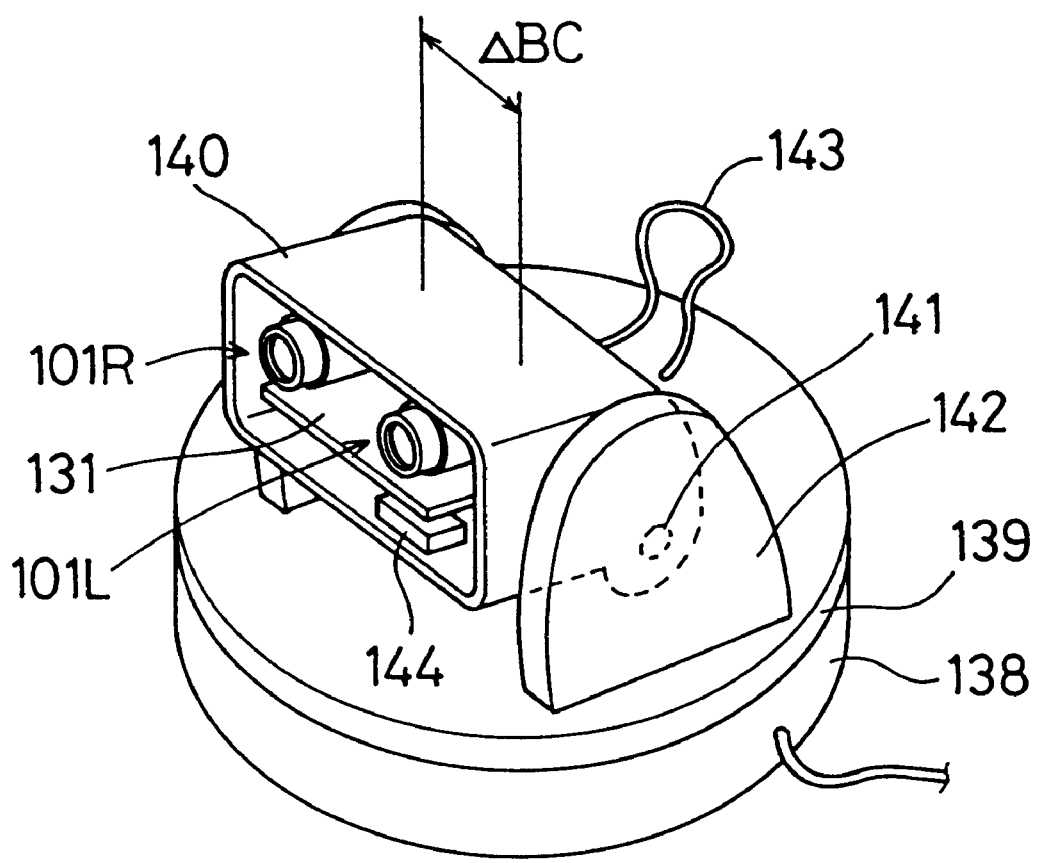
FIG. 6 is a projected perspective view of the three-dimensional camera.

Referring to FIG. 6, there is shown the appearance of the three-dimensional camera 1. The three-dimensional camera 1 has a fixing board 138, which is set at a horizontal place or fixed horizontally by a tripod when the three-dimensional camera 1 is used. On the fixing board 138, a rotary board 139 is set which is horizontally rotatable leftward and rightward up to 180°. The left and right cameras 101L and 101R and the board 131 are housed in a camera case 140 and set on the rotary board 139.

The camera case 140 has a rotary shaft 141 at each of its left and right sides. The rotary board 139 is provided with a pair of rotary shaft supporting arms 142 for supporting the rotary shaft 141. The camera case 140 is rotatably supported by the rotary shaft supporting arms 142 with the rotary shaft 141 being parallel to the rotary board 139. Thereby, the camera case 140 is supported on the rotary board 139 and rotatable in the vertical direction. The rotary shaft 141 is set to be parallel to a straight line passing the centers of light receiving surfaces of the left and right CCD sensors 103L and 103R and to orthogonally intersect the central axis of rotation of the rotary board 139. The left and right cameras 101L and 101R are arranged so that the centers of light receiving surfaces of the CCD sensors 103L and 103R are located at equal distances from the center of rotation of the rotary board 139.

Signals for controlling the movements of the left and right cameras 101L and 101R and video signals from the left and right cameras 101L and 101R are inputted and outputted through a signal cable 143. The camera case 140 is provided with a horizontal sensor 144 comprising a mercury switch which detects the horizontality of the three-dimensional camera 1. The horizontal sensor 144 is closed when the camera 1 is set horizontally, i.e. when the camera 1 is not rotated with respect to the rotary shaft 141 in the vertical direction. In FIG. 6, ΔBC represents the distance between the centers of light receiving surfaces of the CCD sensors 103L and 103R. This distance is the previously-mentioned base length of the three-dimensional camera.

Figure 7:
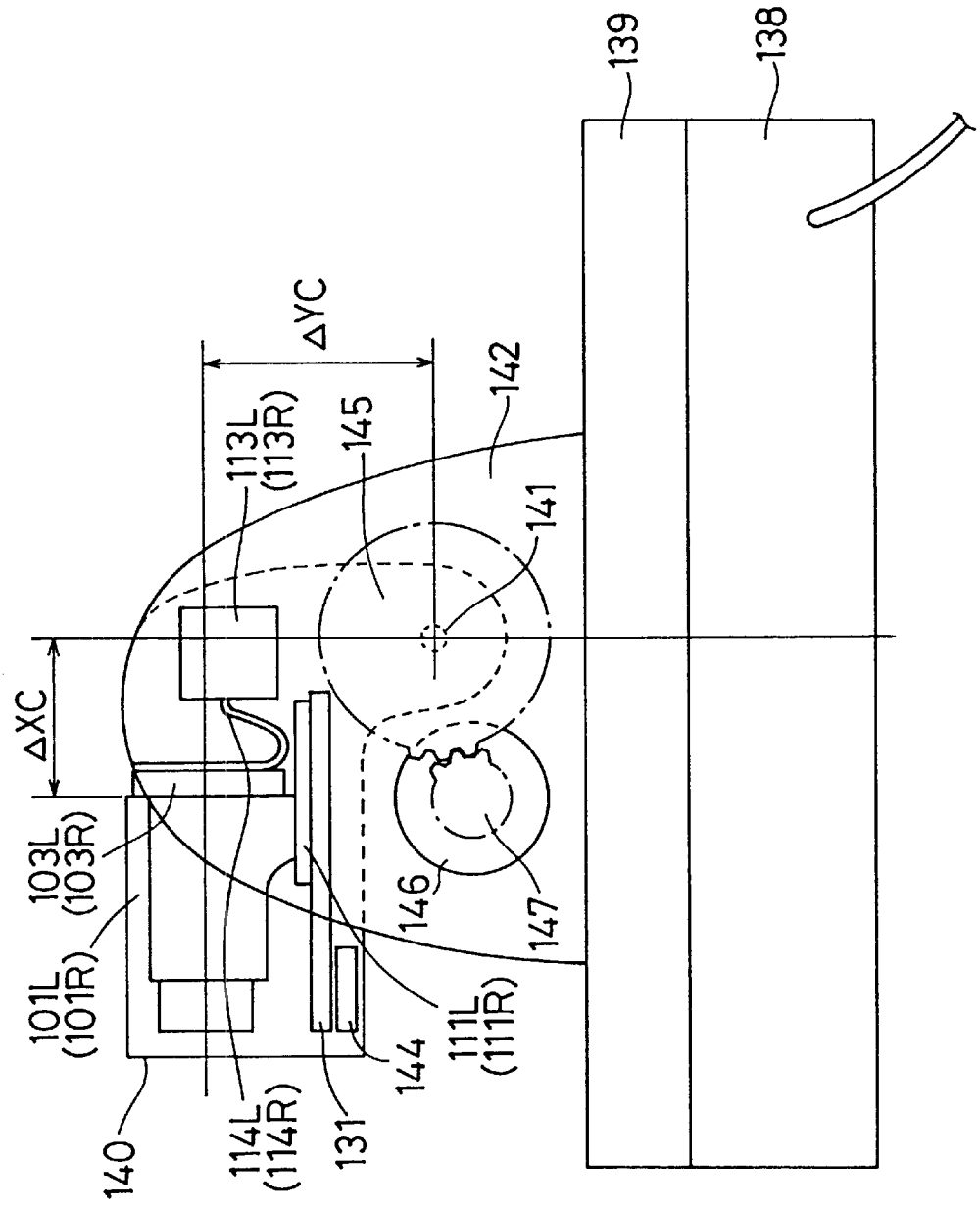
FIG. 7 is a perspective side view showing a vertical direction setting mechanism of the three-dimensional camera.

Referring to FIG. 7, there is shown a side view of the three-dimensional camera a part of which is shown as a perspective. A gear 145 is provided at an end of the rotary shaft 141 of the camera case 140. The gear 145 engages in the rotary shaft supporting arm 142 with a gear 147 coupled to a stepping motor 146. The rotation of the stepping motor 146 is transmitted to the rotary shaft 141 to rotate the camera case 140 in the vertical direction. The left and right cameras 101L and 10R, the board 131 and the gears 111L and 111R are shown as a perspective. Driver circuits 113L and 113R of the CCD sensors 103L and 103R are arranged behind the left and right cameras 101L and 101R. The circuits 113L and 113R are connected to the CCD sensors 103L and 103R through flexible connecting board 114L and 114R, respectively.

Figure 8:
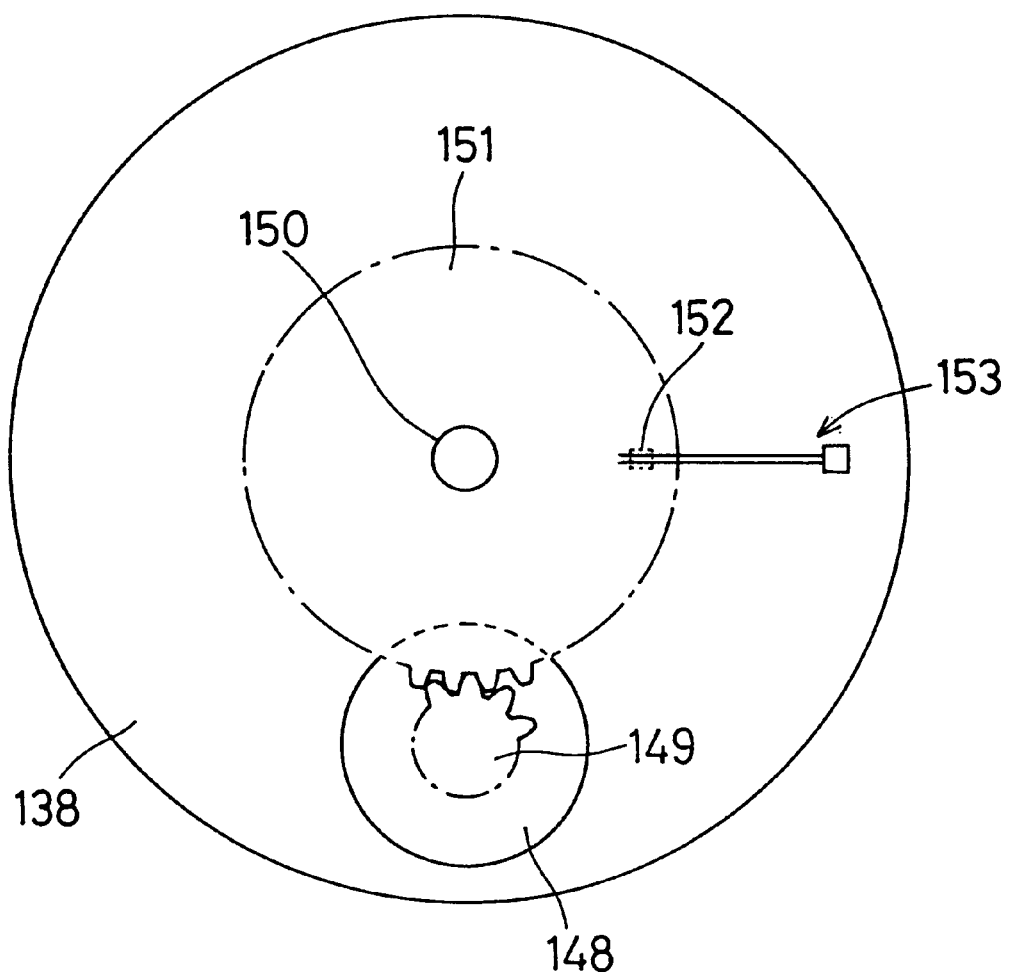
FIG. 8 is a plan view showing a horizontal direction setting mechanism of the three-dimensional camera.

Referring to FIG. 8, there is shown a mechanism for setting the horizontal direction of the three-dimensional camera 1. In the fixing board 138, a stepping motor 148 is set to which a gear 149 is coupled. In the center of the rotary board 139, a rotary shaft 150 is provided to which a gear 151 is coupled. The gears 149 and 151 engage with each other, so that the rotary board 139 rotates with respect to the fixing board 138 by the rotation of the stepping motor 148.

A small conductive pattern 152 is formed on the surface of the gear 151. The fixing board 138 is provided with an electric switch 153 so that it can be in contact with the conductive pattern 152. The switch 153 is activated when its terminals are both in contact with the conductive pattern 152. The conductive pattern 152 is arranged to activate the switch 153 when the rotary board 139 is oriented to a predetermined direction relative to the fixing board 138, and is used for sensing a reference direction of the three-dimensional camera. The rotary board 139 rotates leftward and rightward up to 180° from the position where the switch 153 is closed.

As shown in FIG. 7, when the three-dimensional camera 1 is set with the fixing board 138 being horizontal, the center of rotation of the rotary board 139 is located behind the light receiving surfaces of the CCD sensors 103L and 103R by $\Delta$XC and the center of rotation of the camera case 140 in the vertical direction is located below the centers of light receiving surfaces of the CCD sensors 103L and 103R by $\Delta$YC.

Figure 29:
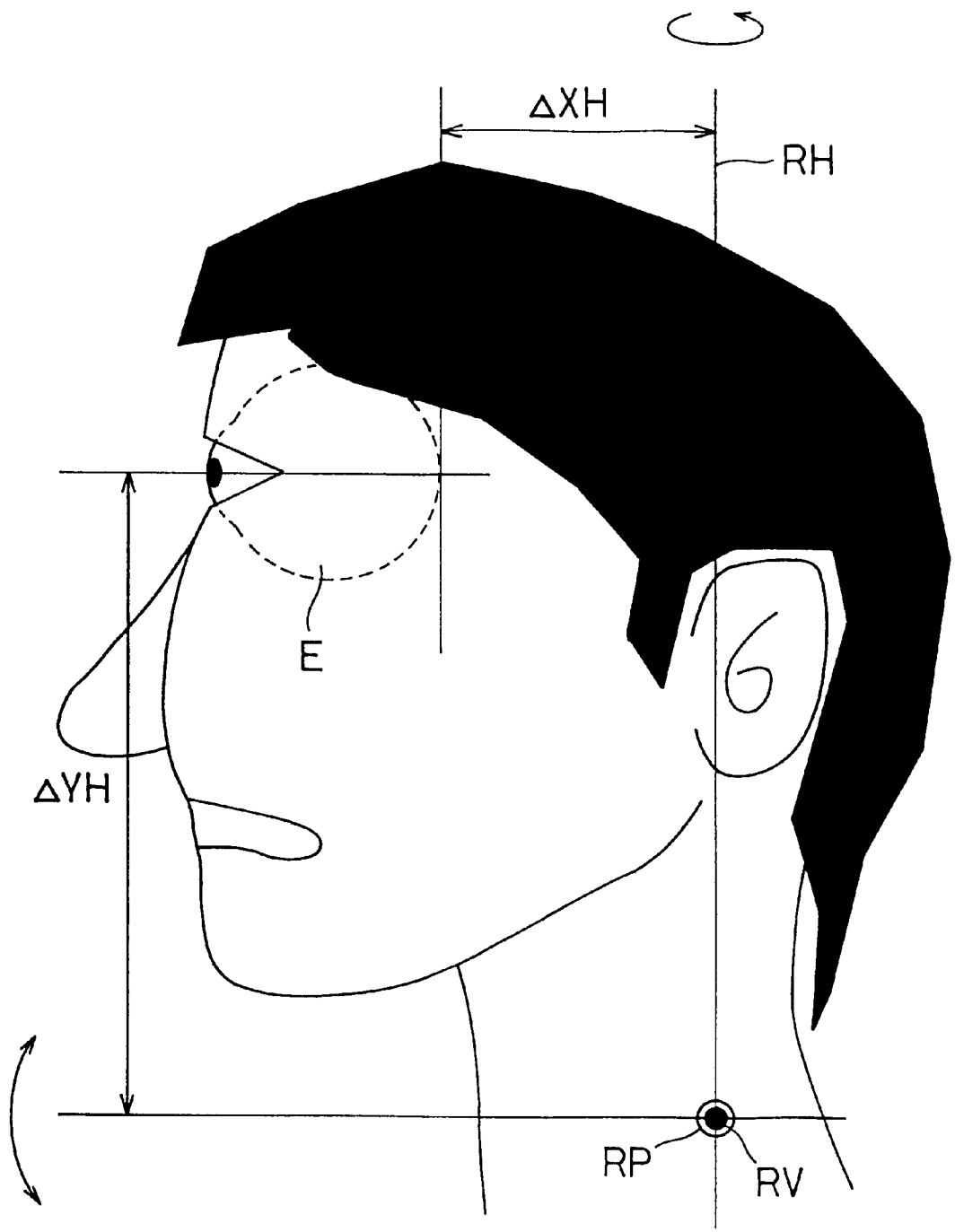
FIG. 29 is a side view showing a rotation of the human head.

The three-dimensional camera 1 structured as described above is capable of rotating in a manner similar to the rotation of the human head. Specifically, as shown in FIG. 29, the vertical rotation of the human head is made about an axis RV which passes through a point RP located at the center in the left and right direction in the rear part of the neck and that is perpendicular to the plane of the figure. The axis RV is located behind and below the retina of the eye E by $\Delta$XH and $\Delta$YH, respectively. The horizontal rotation is made about an axis RH which passes through the point RP.

Figure 31A:
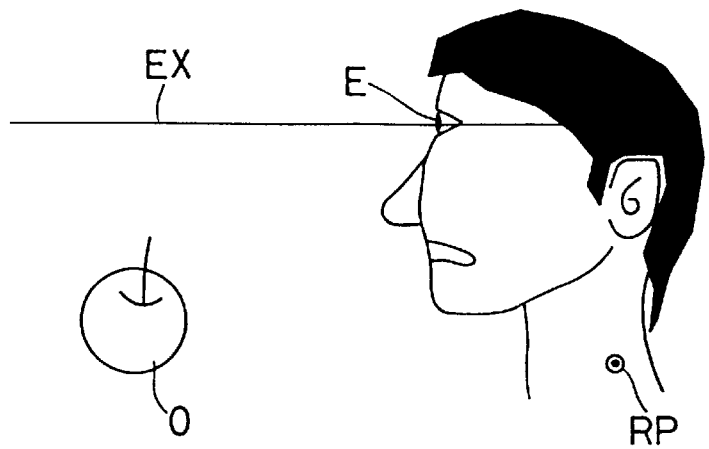
FIGS. 31A to 31C are side views showing a vertical rotation of the human head.
Figure 31B:
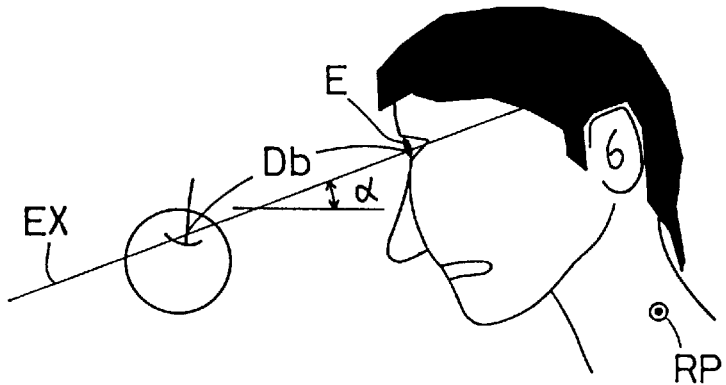
Figure 31C:
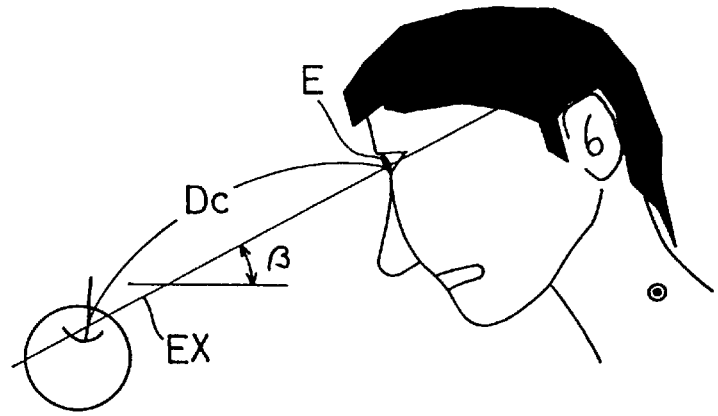

Referring to FIGS. 31A to 31C, there is shown a manner in which an image is viewed by rotating the head in the vertical direction. The object O is located close to the viewer and below the horizontal visual axis EX (FIG. 31A). To view the object O, the head is rotated downward about the point RP located in the rear of the neck (FIG. 31B). This is the natural motion of the human head. At this time, the visual axis EX is at an angle $\alpha$ to horizontal, and the distance between the eye E and the object O is Db. When the object O is viewed by rotating the head downward about the eye E (FIG. 31C), the visual axis EX is at an angle $\beta$ to horizontal and the distance between the eye E and the object O is Dc. When the object O is viewed by rotating the eye E downward without moving the head, the positional relationship between the object O and the eye E is the same as that of FIG. 31C: the visual axis EX is at the angle $\beta$ to horizontal and the distance between the eye E and the object O is Dc.

Here, $\beta$ is greater than $\alpha$, and Dc is greater than Db. The motion of FIG. 31C in which the head is rotated about the eye E is very unreal. Although it is possible to move only the eye E without moving the head, such a motion is unnatural motion only performed consciously. The differences between $\alpha$ and $\beta$ and between Db and Dc are small when the distance between the viewer and the object is great, but increases as the distance decreases.

Therefore, in the three-dimensional camera, the setting position of the axis of rotation is important for taking natural images. As shown in FIG. 7, the center of horizontal rotation of the three-dimensional camera is located behind the light receiving surfaces of the CCD sensors 103L and 103R by $\Delta$XC, and the center of vertical rotation thereof is located below the centers of light receiving surfaces of the CCD sensors 103L and 103R by $\Delta$YC. This is the same as the relationship between the eye of the human head and the rotation axes RH and RV and reproduces the natural human motion shown in FIG. 31B.

Figure 30:
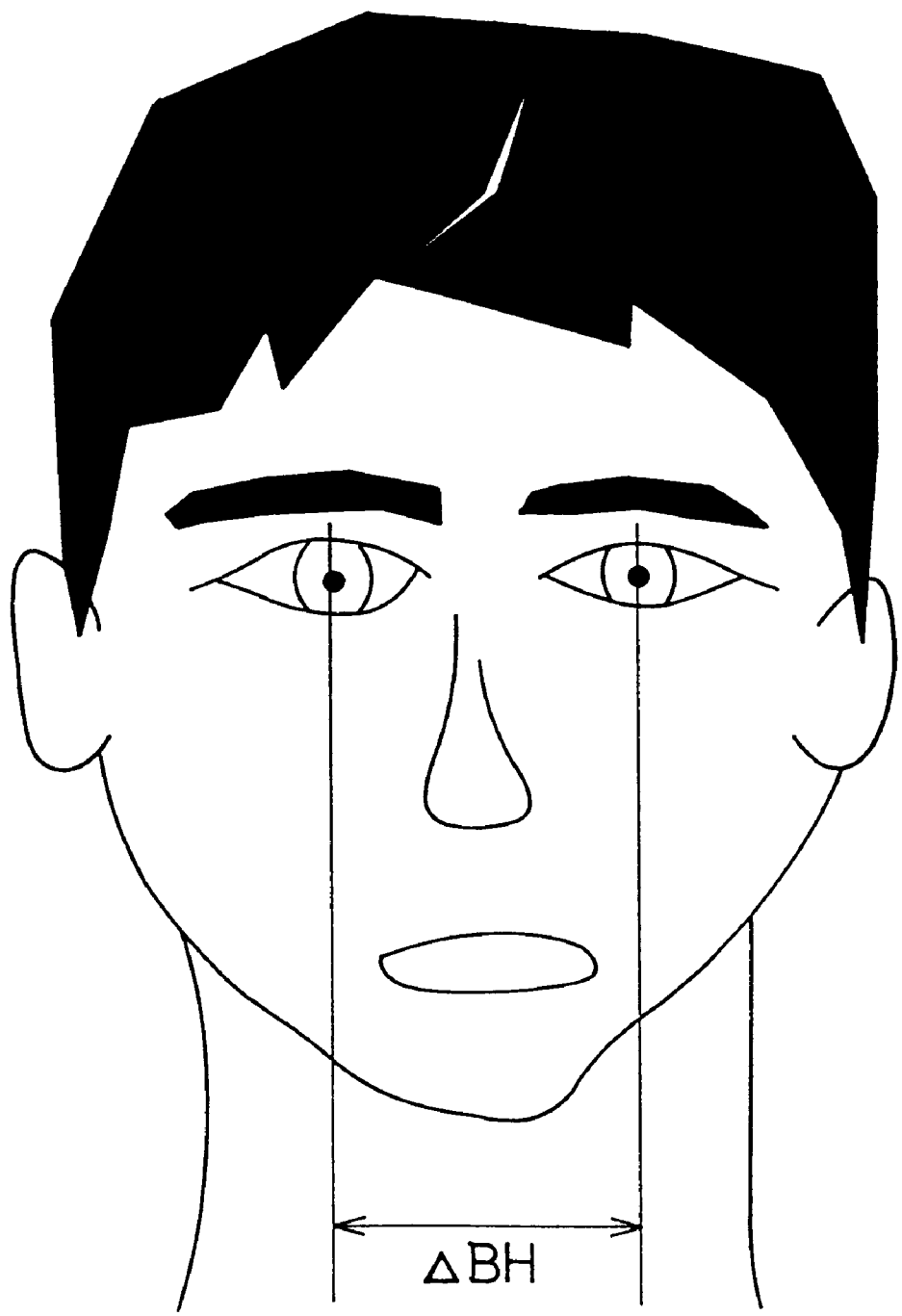
FIG. 30 is a front view showing the human pupil distance.

A distance $\Delta$BH between the eyes shown in FIG. 30 is the basis of the distance recognition by the human vision and corresponds to the base length $\Delta$BC of the three-dimensional camera. In order to take natural stereoscopic images, in addition to appropriately setting the centers of vertical and horizontal rotations of the three-dimensional camera, it is necessary to correctly set the base length $\Delta$BC in consideration of the distances from the centers of light receiving surfaces of the CCD sensors 103L and 103R to the centers of rotations. In this embodiment, an analogous relationship is provided between the rotation of the three-dimensional camera and the rotation of the human head for taking natural stereoscopic images, so that more realistic images are viewed through the HMD. Specifically, the ratios of $\Delta$XC to $\Delta$XH, $\Delta$YC to $\Delta$YH and $\Delta$BC to $\Delta$BH are all set equal, so that the three-dimensional camera is similar to the human head.

Figure 27:
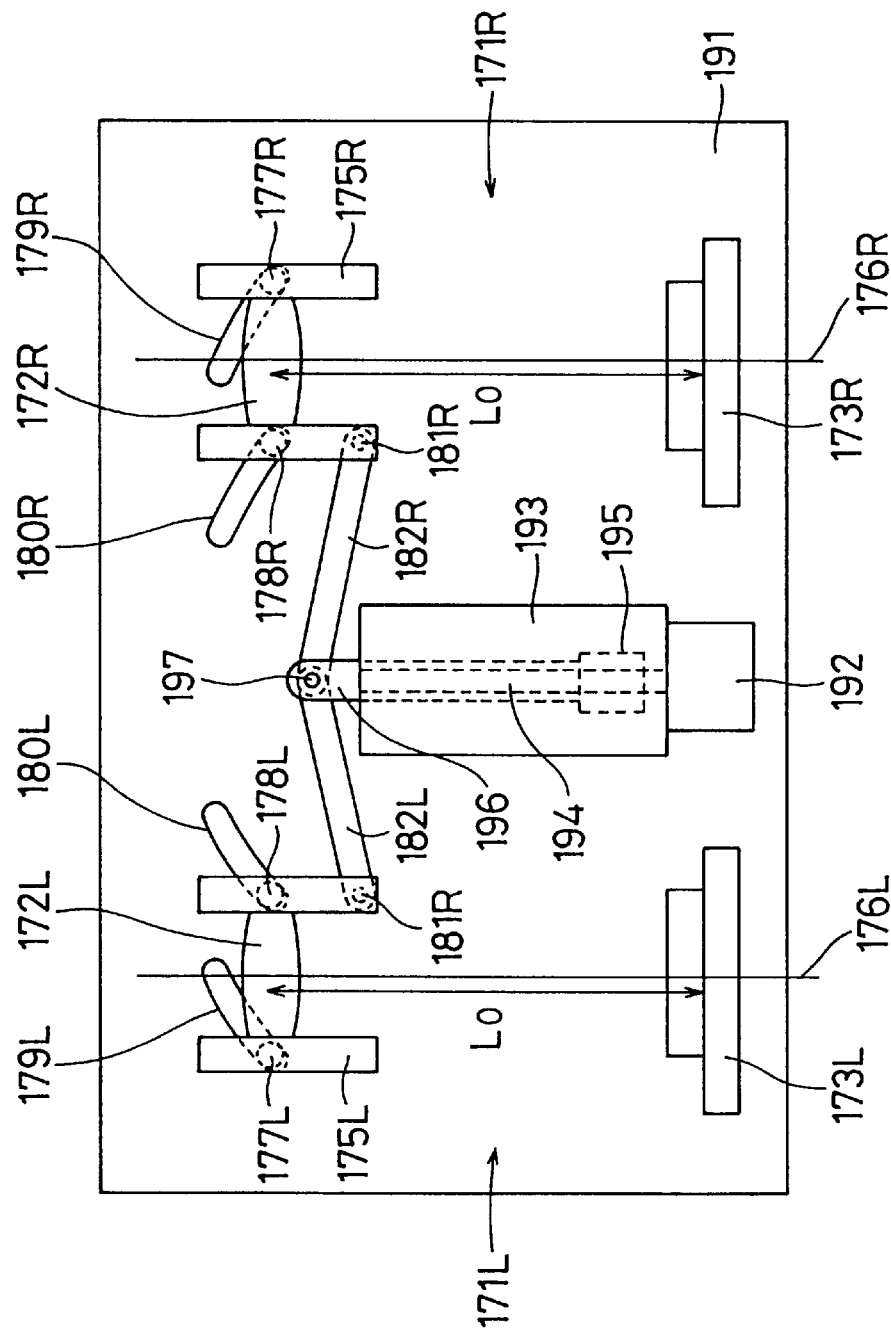
FIG. 27 is a plan view showing a second arrangement of the three-dimensional camera when an object at infinity is shot.

Referring to FIG. 27, there is shown a second structure of the three-dimensional camera. Left and right cameras 171L and 171R are symmetrically set on a board 191. A CCD sensor 173L of the left camera 171L is vertically fixed to the board 191. A left taking lens 172L fixed in a lens holding barrel 175L is arranged in front of the CCD sensor 173L. Pins 177L and 178L are provided at lower parts of the outer surface of the lens holding barrel 175L. The pins 177L and 178L engage with cam grooves 179L and 180L, respectively. The lens holding barrel 175L is further provided with an arm 182L through a pin 181L. The arm 182L is rotatable about the pin 181L.

The right camera 171R is structured similarly to the left camera 171L. The left and right CCD sensors 173L and 173R are arranged so that their light receiving surfaces are flush with each other. A stepping motor 192 is fixed to the board 191 at a position intermediate between the left and right CCD sensors 173L and 173R and is coupled to a rotary shaft 194 supported by a shaft supporting frame 193. A movable member 195 which is movable along the rotary shaft 194 is provided to be in contact with the shaft 194. External threads are formed on the outer surface of the rotary shaft 194 and internal threads meshing therewith are formed on the movable member 195, so that the movable member 195 moves backward and forward along the rotary shaft 194 when the stepping motor 192 rotates. An arm 196 extending frontward is fixed to the movable member 195. The front end of the arm 196 is connected through a pin 197 to the ends of the arms 182L and 182R connected to the left and right lens holding barrels 175L and 175R. The left and right arms 182L and 182R rotate about the pin 197 with respect to the arm 196. With this arrangement, the rotation of the stepping motor 192 is transmitted to the left and right lens holding barrels 175L and 175R through the arms 196, 182L and 182R.

Figure 28:
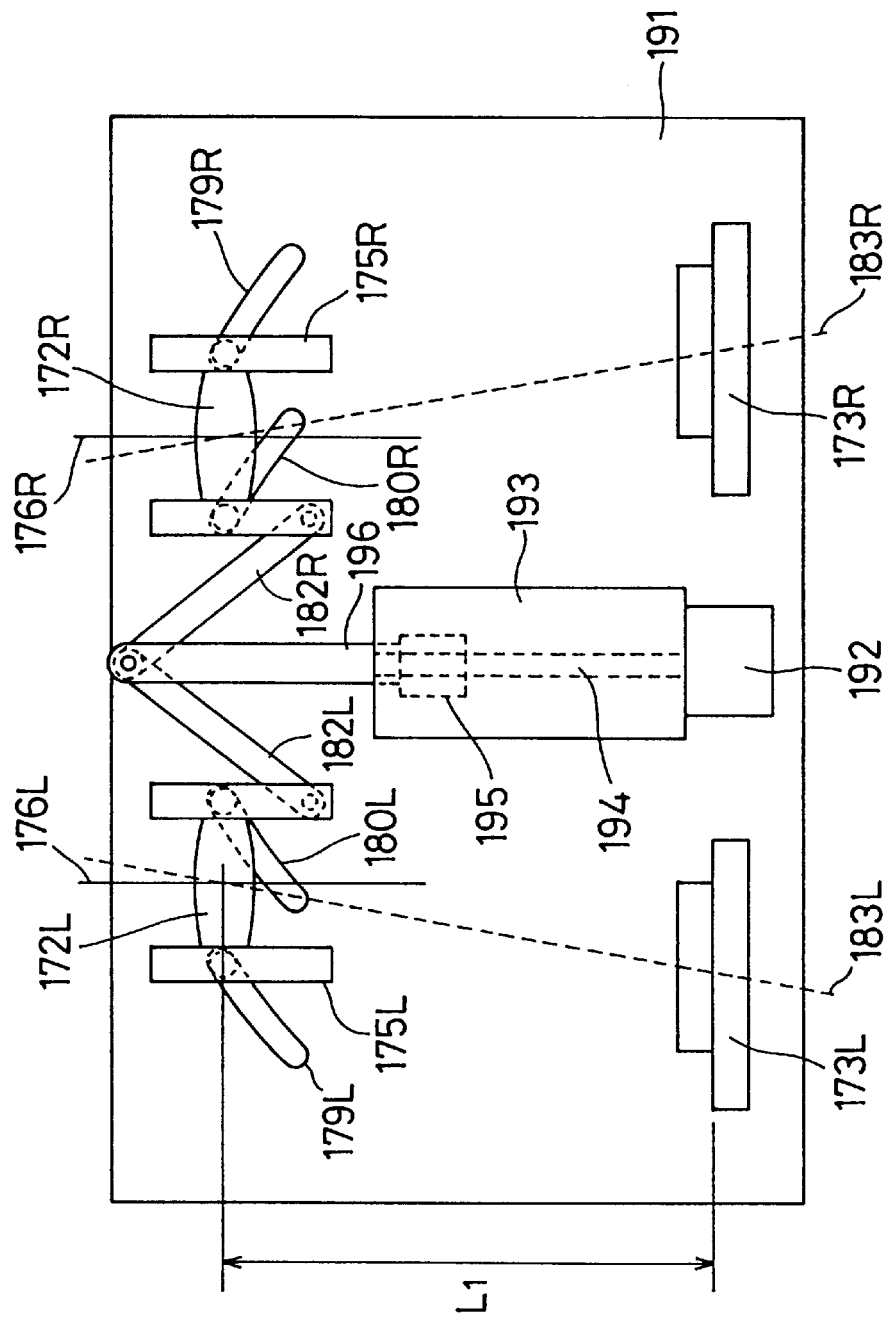
FIG. 28 is a plan view showing the second arrangement of the three-dimensional camera when an object at a short distance is shot.

In FIG. 27, the convergence of the left and right cameras 171L and 171R is set for an object at infinity, and optical axes 176L and 176R are parallel to each other. Referring to FIG. 28, there is shown a condition where the left and right lens holding barrels 175L and 175R are driven by the rotation of the stepping motor 192 so that the convergence is set for an object at a short distance. At this time, the optical axes 176L and 176R of the left and right taking lenses 172L and 172R are parallel to each other. The object is located at the intersection of a line 183L between the center of light receiving surface of the left CCD sensor 173L and the center of the left taking lens 172L and a line 183R between the center of light receiving surface of the right CCD sensor 173R and the left taking lens 172R.

While the distance from the taking lens 172L and 172R to the light receiving surfaces of the CCD sensors 173L and 173R is $L_0$ when the convergence is set for an object at infinity, the distance $L_1$ is longer when the convergence is set for an object at a short distance. By making the distance adjustment appropriately, a correct focus condition is set according to the object distance. The configurations of the cam grooves 179L, 180L, 179R and 180R of the board 191 are set so that focus condition is appropriately set in accordance with the variation in convergence. In addition, the cam grooves 179L, 180L, 179R and 180R are formed so that the left and right optical axes 176L and 176R are always parallel to each other.

Figure 19A:
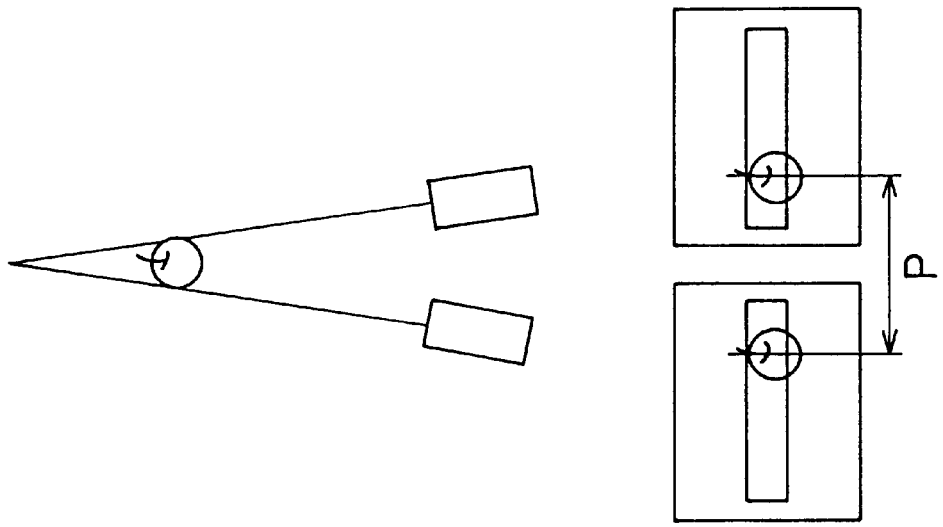
FIGS. 19A to 19C show a relationship between the convergence setting of the three-dimensional camera and the distance between left and right images.
Figure 19B:
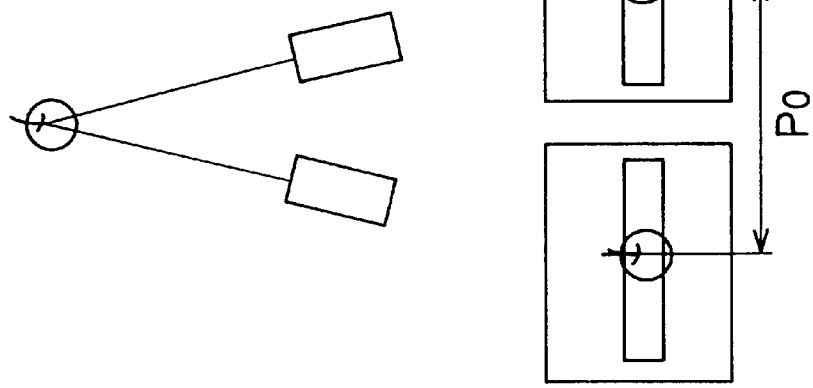
Figure 19C:
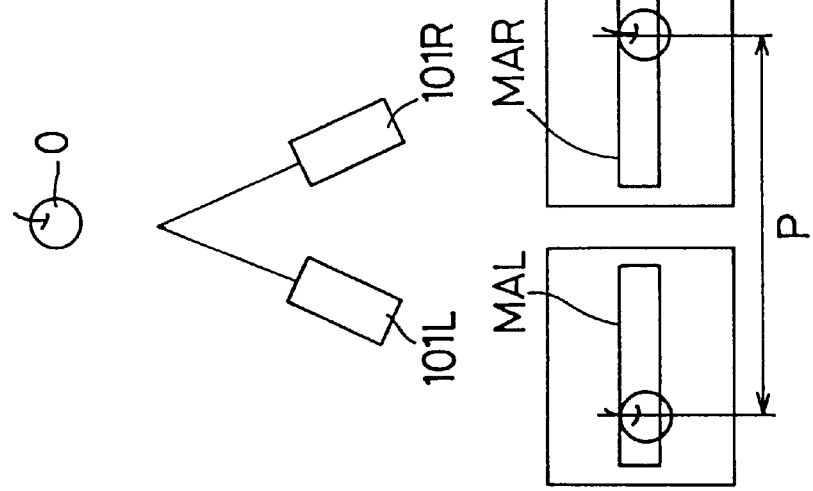

The detection of the object distance in the stereoscopic system will be described. Referring to FIGS. 19A to 19C, there are shown conditions where the convergence is set to be large (FIG. 19A), where the convergence is appropriately set (FIG. 19B) and where the convergence is set to be small (FIG. 19C) and images taken by the left and right CCD sensors 103L and 103R in each condition. When the left and right cameras 101L and 101R are directed to the object and the convergence is appropriately set (FIG. 19B), the image of the object is formed in the center in the left and right direction both in the left and right CCD sensors 103L and 103R. When the left and right cameras 101L and 101R rotate about the centers of light receiving surfaces of the CCD sensors 103L and 103R like the three-dimensional camera of this embodiment, a distance $P_0$ between the left and right object images at this time takes a constant value particular to the camera irrespective of the distance from the camera to the object. The distance $P_0$ between the left and right images is referred to as a reference image-to-image distance. When the convergence is too large (FIG. 19A), the object images are shifted outward from the centers of the light receiving surfaces. When the convergence is too small (FIG. 19C), the object images are shifted inward from the centers. The object distance can be obtained from the distance P between the left and right object images and the convergence of the three-dimensional camera set at that time.

Figure 20:
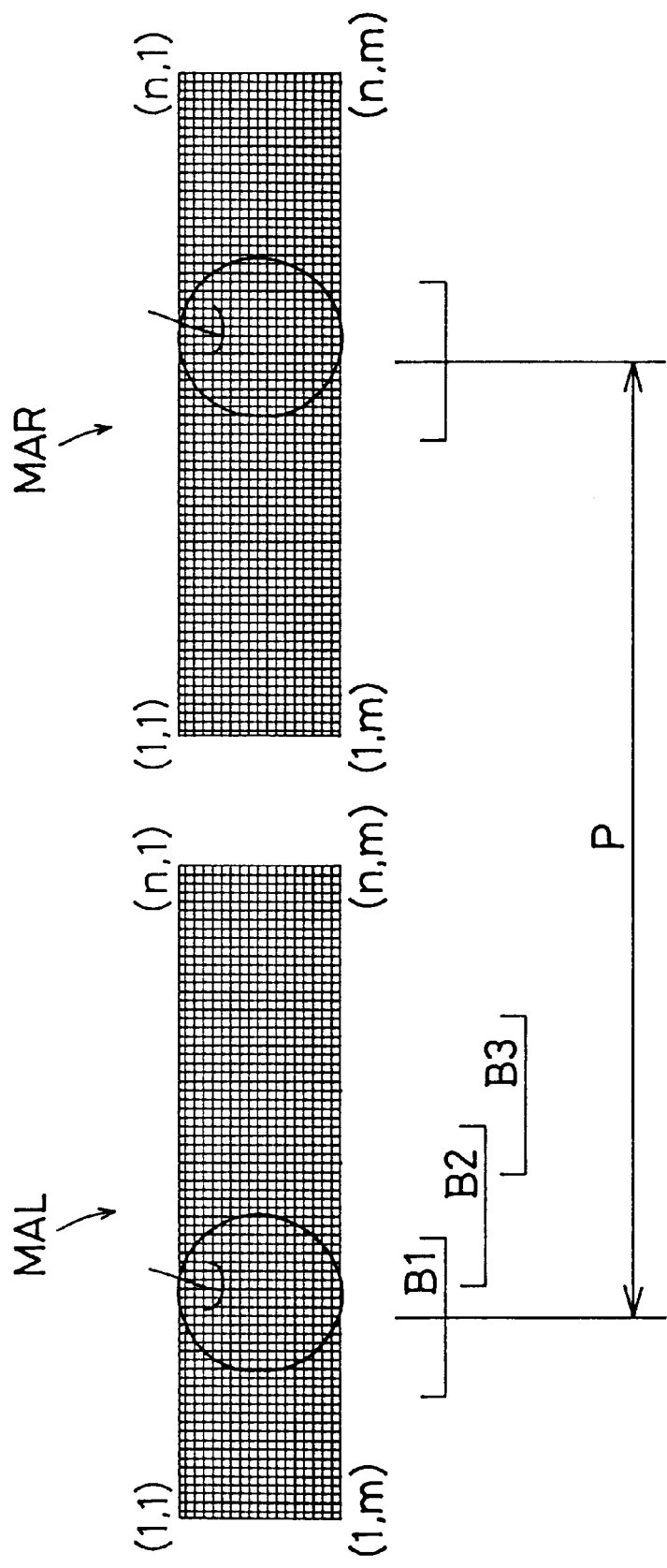
FIG. 20 shows distance measurement areas of the three-dimensional camera and the left and right images.

The distance P between the left and right object images is detected in the following manner: Assume now that rectangular distance measurement areas MAL and MAR which are longer in the lateral direction are provided in the longitudinal center of the light receiving surfaces of the left and right CCD sensors 103L and 103R. Referring to FIG. 20, there is shown an enlarged view of the left and right distance measurement areas MAL and MAR of FIG. 19A. Each area includes n pixels in the lateral direction and m pixels in the longitudinal direction. The data included in each pixel of the left distance measurement area MAL is represented by XL(i,j). The data included in each pixel of the right distance measurement area MAR is represented by XR(i,j). Here, i=1 to n, and j=1 to m. First, the pixel data of the left and right distance measurement areas MAL and MAR are added in the longitudinal direction to convert them into lateral one-dimensional data rows YL(i) and YR(i).

$$YL(i) = \sum_{j=1}^{m} XL(i, j) \quad (i = 1, \cdots, n)$$

$$YR(i) = \sum_{j=1}^{m} XR(i, j) \quad (i = 1, \cdots, n)$$

Then, detection blocks B1, B2 and B3 with a block size bn are set in the left distance measurement area MAL.

$$B1 = YL(i) \quad (i = k1, \cdots, k1 + bn - 1)$$

$$B2 = YL(i) \quad (i = k2, \cdots, k2 + bn - 1)$$

$$B3 = YL(i) \quad (i = k3, \cdots, k3 + bn - 1)$$

With respect to each of the detection blocks B1, B2 and B3, correlation with the one-dimensional data row YR(i) of the right distance measurement area MAL is calculated.

$$Z1(ks) = \sum_{j=0}^{bn-1} |YL(k1 + j) - YR(ks + j)| \quad (ks = 1, \cdots, n - bn + 1)$$

$$Z2(ks) = \sum_{j=0}^{bn-1} |YL(k2 + j) - YR(ks + j)| \quad (ks = 1, \cdots, n - bn + 1)$$

$$Z3(ks) = \sum_{j=0}^{bn-1} |YL(k3 + j) - YR(ks + j)| \quad (ks = 1, \cdots, n - bn + 1)$$

After these calculations, values of ks are found for which Z1(ks), Z2(ks) and Z3(ks) are minimum, respectively, to obtain the distance P. In FIG. 20, the distance P has been obtained in the detection block B1. When the distance P between the left and right object images is thus obtained, the distance from the three-dimensional camera to the object is calculated based on the base length of the three-dimensional camera and the convergence of the left and right cameras.

While an example using three detection blocks is explained here, the number of detection blocks is to be set so that all the pixels of the one-dimensional data row YL(i) are included in any of the blocks. The block size bn is to be set in accordance with the number of blocks. Adjoining blocks may partly overlap so that the elements of the one-dimensional data row YL(i) belong to two or more blocks or the size bn may be set so that each element of the data row YL(i) belongs to only one block.

Figure 9:
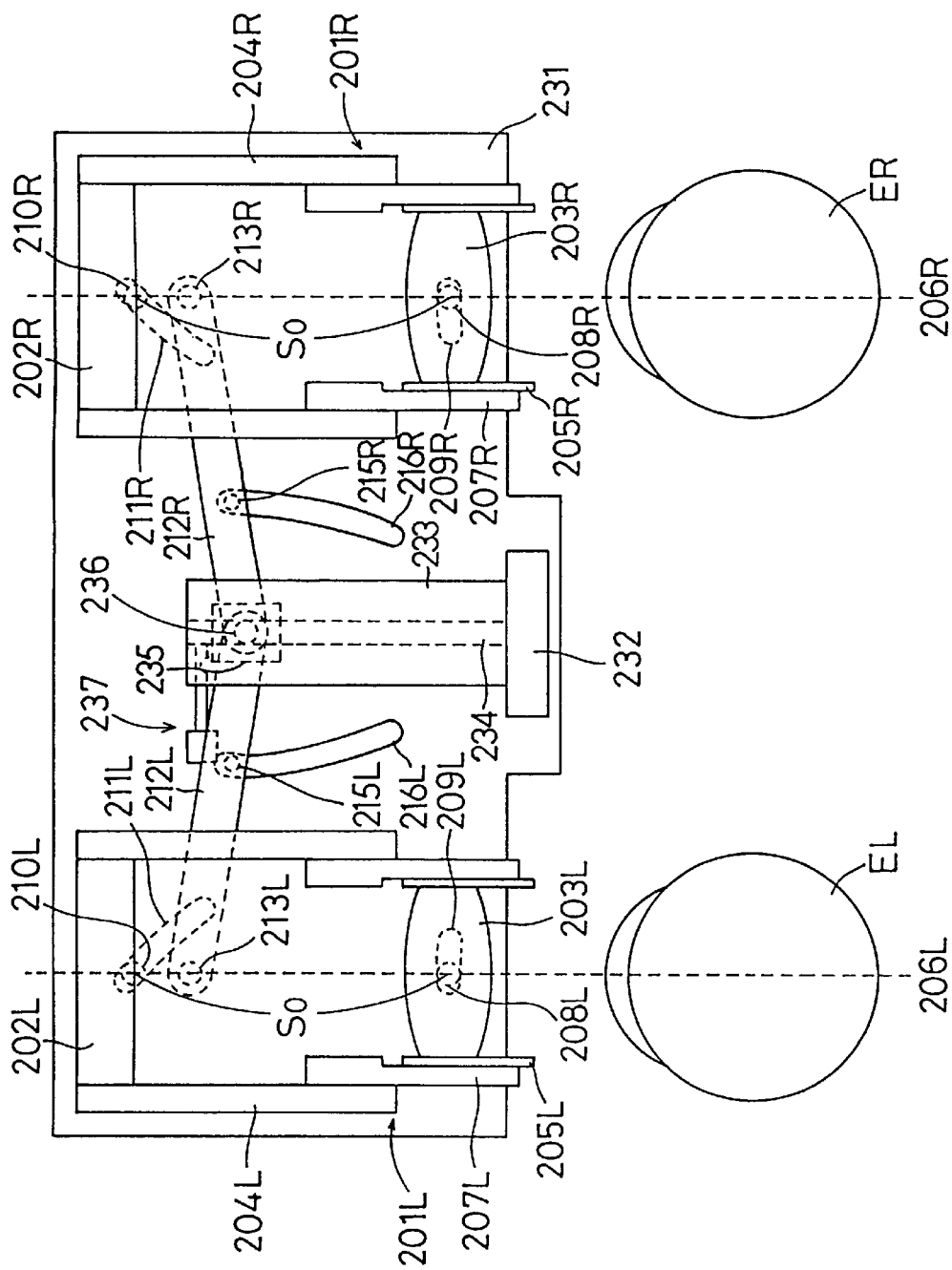
FIG. 9 is a plan view showing an arrangement of an HMD when an object at infinity is displayed.

Referring to FIG. 9, there is shown the structure of the HMD of this embodiment. In the HMD 2, a pair of left and right virtual image projectors 201L and 201R are set on a board 231. The left virtual image projector 201 includes a display 202L, an eyepiece 203L comprising a convex lens which directs the image displayed on the display 201L to the left eye EL, a display holding barrel 204L which holds the display 202L, a lens holding barrel 205L for holding an eyepiece 203L therein and a dioptric power correction barrel 207L which holds the lens holding barrel 205L to be movable backward and forward. A liquid crystal display (LCD) is used as the display 202L, which is set to be vertical to an optical axis 206L of the eyepiece 203L so that the optical axis 206L passes the center of the display surface.

The inner dimensions of the display holding barrel 204L is slightly larger than the outer dimensions of the dioptric power correction barrel 207L, so that a rear inner surface of the display holding barrel 204L and a front outer surface of the dioptric power correction barrel 207L are slidingly in contact with each other.

The lens holding barrel 205L is cylindrical and has external threads on its outer surface. The dioptric power correction barrel 207L has on its inner surface internal threads which mesh with the external threads of the barrel 205L. By rotating the lens holding barrel 205L about the optical axis 206L, the lens holding barrel 205L and the eyepiece 203L move backward and forward along the optical axis 206L. Thereby, the distance between the eyepiece 203L and the display 202L varies. The dioptric power of the viewer is thus compensated for according to individual difference. The right virtual image projector 201R is structured similarly to the left virtual image projector 201L. The left and right dioptric power correction is made independently of each other.

Pins 208L and 208R are provided at lower parts of the outer surfaces of the dioptric power correction barrels 207L and 207R. The pins 208L and 208R are inserted into cam grooves 209L and 209R formed in the board 231. Pins 210L and 210R are formed at lower parts of the outer surfaces of the display holding barrels 204L and 204R. The pins 210L and 210R are inserted into cam grooves 211L and 211R formed in the board 231, respectively. A stepping motor 232 is fixed to the board 231 at a position intermediate between the left and right eyepieces 203L and 203R and is coupled to a rotary shaft 234 supported by a shaft supporting frame 233. External threads are formed on the outer surface of the rotary shaft 234 and mesh with internal threads formed on a movable member 235. By the rotation of the stepping motor 232, the movable member 235 moves backward and forward along the rotary shaft 234.

The movable member 235 is provided with a pin 236. Two arms 212L and 212R are attached to the movable member 235 so as to be rotatable about the pin 236. The left display holding barrel 204L is provided with a pin 213L at a lower part of its outer surface and is rotatably coupled to an end of the arm 212L. Likewise, the right display holding barrel 204R is coupled to the arm 212R through a pin 213R. Pins 215L and 215R are provided in the middle of the arms 212L and 212R. The pins 215L and 215R are inserted into cam grooves 216L and 216R provided in the board 231, respectively. An electric switch 237 is provided on the board 231 in the vicinity of an end of the rotary shaft 234. The switch 237 is set to be closed when the movable member 235 is located at the end of the rotary shaft 234 to push one terminal of the switch 237. The left and right virtual image projectors 201L and 201R and the arms 212L and 212R are arranged symmetrically with respect to the rotary shaft 234.

Figure 12:
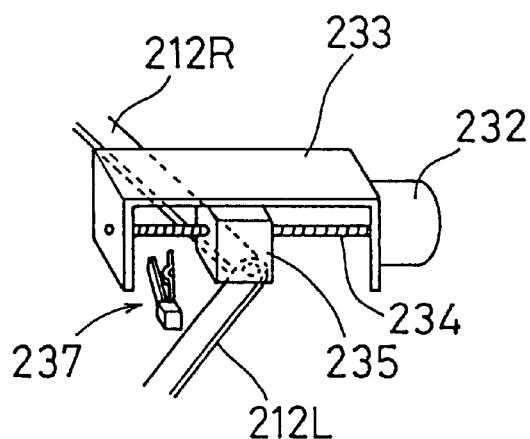
FIG. 12 is a perspective view showing a relevant portion of a convergence and dioptric power setting mechanism of the HMD.

Referring to FIG. 12, there is shown a perspective view of a vicinity of the stepping motor 232. By the rotation of the stepping motor 232, the rotary shaft 234 is rotated, so that the movable member 235 moves leftward and rightward in the figure, i.e. backward and forward in the HMD 2. The left and right arms 212L and 212R move together therewith. While the switch 237 is open in FIG. 12, the switch 237 is closed by the movable member 235 when the movable member 235 has moved to the vicinity of the left end of the rotary shaft, i.e. to the vicinity of the front end of the rotary shaft 234 of the HMD 2. That is, the switch 237 is provided at a position where it is closed when the convergence is set for infinity and is used as a reference for the rotation of the left and right virtual image projectors 201L and 201R.

In such an arrangement, when the movable member 235 is moved backward and forward by the rotation of the stepping motor 232, the arms 212L and 212R move so that the pins 215L and 215R provided in the middle of the arms move along the cam grooves 216L and 216R, so that the left and right virtual image projectors 201L and 201R move along the configurations of the cam grooves 209L, 211L, 209R and 211R. FIG. 9 shows a condition where an image in which an object at infinity has been taken is displayed. The movable member 235 is located in the vicinity of the front end of the rotary shaft 234 and the switch 237 is closed. At this time, the optical axes 206L and 206R of the left and right eyepieces 203L and 203R are parallel to each other and pass the centers of the left and right eyes EL and ER, respectively. The display surfaces of the left and right displays 202L and 202R are flush with each other.

Figure 10:
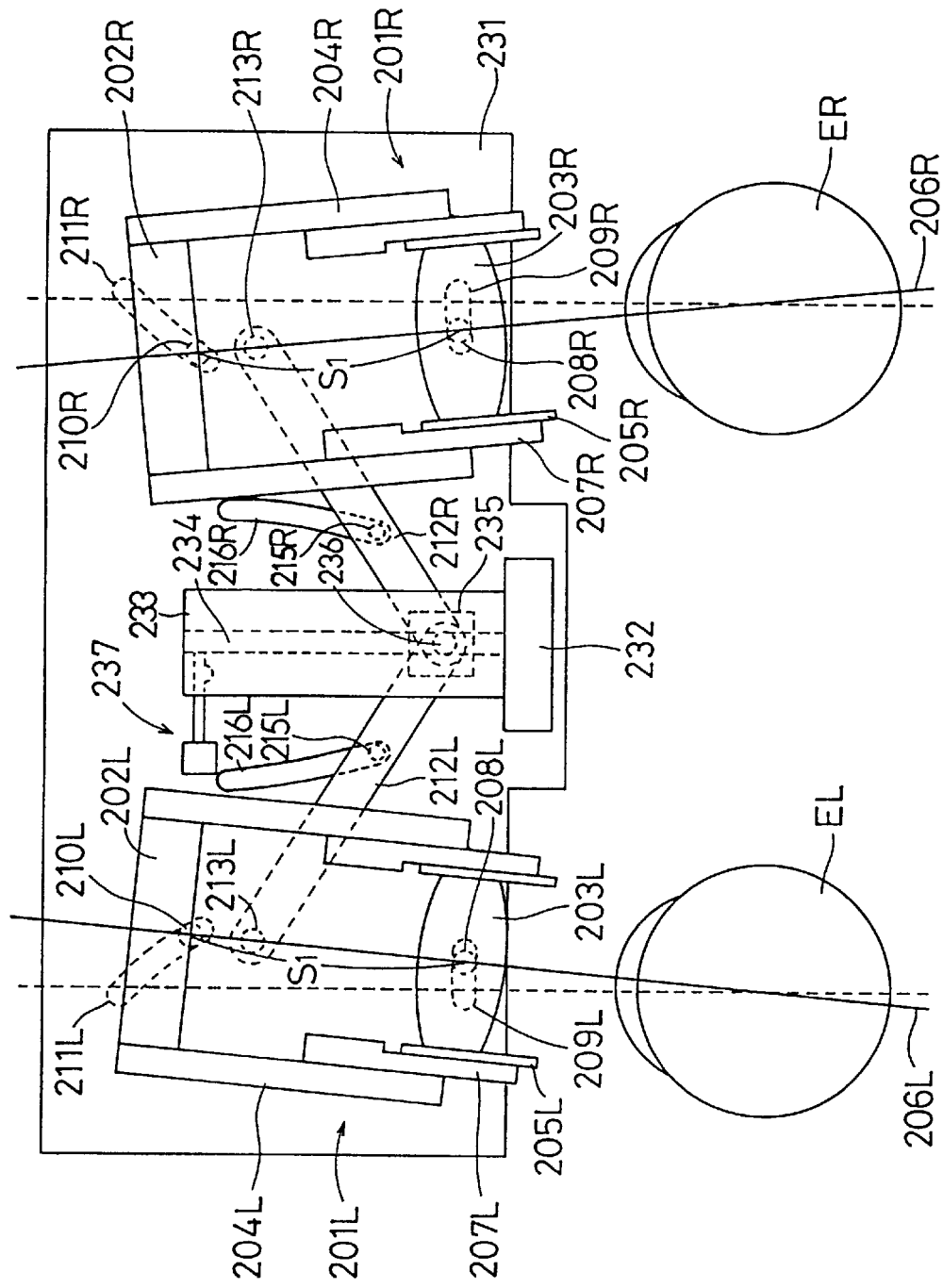
FIG. 10 is a plan view showing the arrangement of the HMD when an object at a short distance is displayed.

Referring to FIG. 10, there is shown the HMD 2 where the stepping motor 232 is rotated to move the movable member 235 toward the side of the motor 232. This corresponds to a condition where an image in which an object at a short distance has been taken is displayed. At this time, the optical axes 206L and 206R of the eyepieces 203L and 203R are inclined inward from the parallel condition and the angle of convergence is set so that the object is located at the intersection of the extensions lines of the optical axes 206L and 206R. The condition that the optical axes 206L and 206R pass the centers of the displays 202L and 202R is maintained like in FIG. 9.

The left and right lens holding barrels 205L and 205R and the dioptric power correction barrels 207L and 207R have moved along the cam grooves 209L and 209R. The left and right display holding barrels 204L and 204R have moved inward along the cam grooves 211L and 211R and are closer to the eyepieces 203L and 203R. The movements of the lens holding barrels 205L and 205R and the display holding barrels 204L and 204R are due to the configurations of the cam grooves 209L, 211L, 209R and 211R. The cam grooves 209L and 209R are in a form of an arc with the eyes EL and ER of the viewer as the center. The left and right virtual projectors 201L and 201R rotate symmetrically with respect to the left and right eyes EL and ER.

In FIG. 9, the convergence is set for an image of an object at infinity and the distance between the eyepieces 203L and 203R and the displays 202L and 202R is $S_0$. On the other hand, when the convergence is set for an image of an object at a short distance like in FIG. 10, the distance is $S_1$. The distance between the eyepieces 203L and 203R and the displays 202L and 202R decreases as the angle of convergence increases and the dioptric power is set in correspondence with the object distance. Thereby, the sense of distance obtained by the convergence interlocks with the sense of distance obtained by the dioptric power, so that a more realistic image is obtained. The dioptric power setting which interlocks with the convergence is made independently of the previously described correction of the deviation of the dioptric power particular to the viewer. The switch 237 is open when the HMD 2 is in a condition for an image of an object in a short distance.

Figure 11:
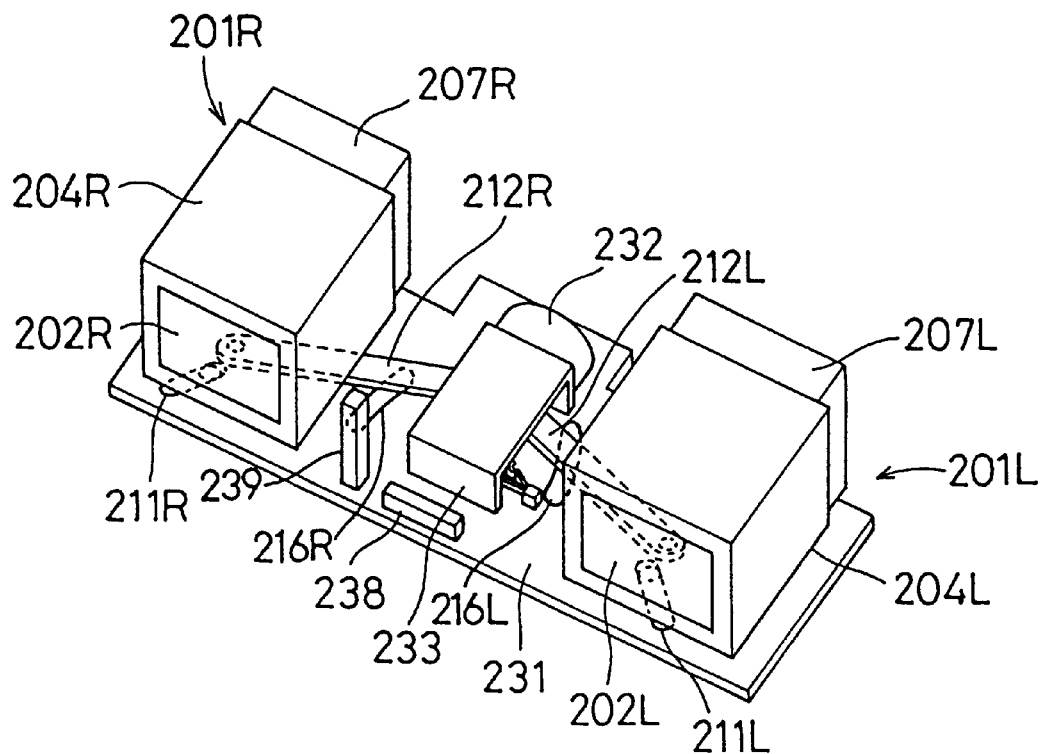
FIG. 11 is a projected perspective view showing a relevant portion of the HMD.

Referring to FIG. 11, there is shown a perspective view of the HMD 2. As described previously, the driving force of the stepping motor 232 is transmitted to the left and right virtual image projectors 201L and 201R through the arms 212L and 212R to set the convergence and dioptric power. The HMD 2 thus structured is covered with a non-illustrated case which is provided with an attachment member for attaching the HMD 2 to the head.

In this stereoscopic system, the direction of the three-dimensional camera is varied in accordance with the movement of the head of the viewer wearing the HMD, the object to which the viewer pays attention is shot by the three-dimensional camera and its image is displayed by the HMD. Thus, it is necessary to sense the movement of the viewer's head. For this purpose, as shown in FIG. 11, a vertical angular velocity sensor 238 for detecting the angular velocity of the vertical rotation and a horizontal angular velocity sensor 239 for detecting the angular velocity of the horizontal rotation are provided on the board 231 of the HMD. In this embodiment, vibrating gyros using piezoelectric ceramics are used as the angular velocity sensors 238 and 239.

The piezoelectric vibrating gyro detects a rotation and outputs a voltage which linearly corresponds to the angular velocity of the rotation. The direction of the rotation is known from the sign of the difference between a voltage outputted when piezoelectric vibrating gyro is rotating and a voltage outputted when the gyro is stationary. The magnitude of the angular velocity is known from the absolute value of the difference. Thus, by continuously detecting the output voltage of the piezoelectric gyro, the direction of the HMD provided with the gyro can be known.

Figure 32A:
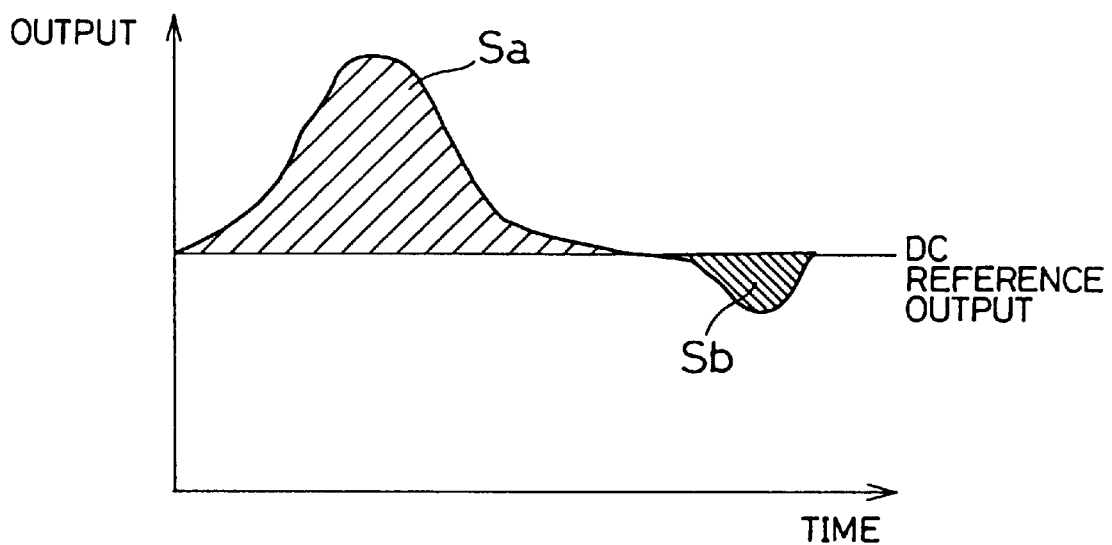
FIGS. 32A and 32B show a detection of direction of the HMD by an angular velocity sensor.
Figure 32B:
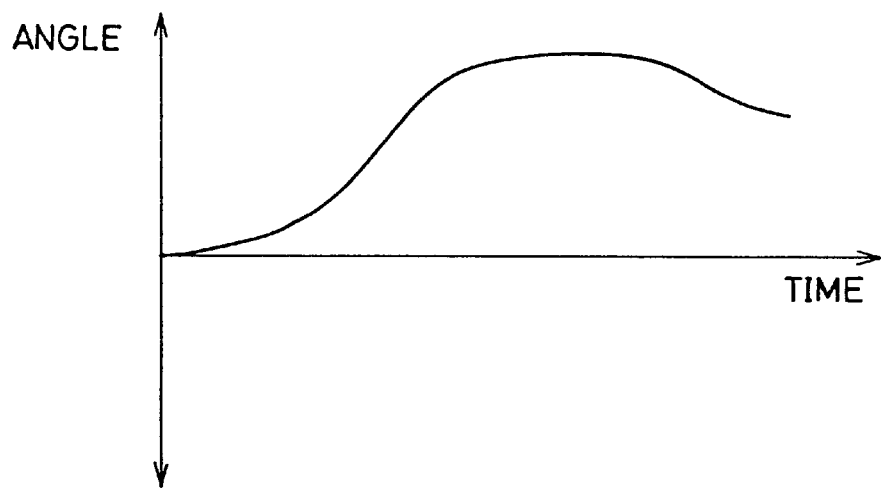

A method of sensing the direction of the HMD in this embodiment will be described with reference to an example shown in FIGS. 32A and 32B. FIG. 32A graphically shows the output of the piezoelectric gyro with respect to time. The direct current (DC) reference output is a voltage outputted when the HMD wearer's head is stationary. The difference between the DC reference voltage and the detected output voltage is proportional to the magnitude of the angular velocity. Therefore, in the figure, the area of a portion Sa enclosed by the DC reference voltage and the curve of the output voltage located thereabove represents an angle of rotation in one direction and the area of a portion Sb enclosed by the DC reference voltage and the curve of the output voltage located therebelow represents an angle of rotation in the opposite direction. The graphical representation of the angle of rotation with respect to time is as shown in FIG. 32B.

The output voltage of the piezoelectric gyro drifts according to the variation in environmental conditions such as the temperature while maintaining the linear relationship with the angular velocity. That is, the graph of FIG. 32A shifts translationally along the ordinate axis. Therefore, to obtain a correct angular velocity by the piezoelectric vibrating gyro, it is necessary to set a DC reference output in accordance with the environmental conditions. Further, the DC reference output differs among piezoelectric vibrating gyros. For this reason, it is necessary to set the DC reference output for each HMD.

In this embodiment, at the activation of the stereoscopic system or at any arbitrary time after the activation, the HMD wearer keeps his or her head stationary for a predetermined period of time to detect the voltages of the piezoelectric gyro outputted during that time and the average of the voltages is used as the DC reference output. Thereby, the variation in output voltage due to the environmental conditions and the non-uniformity of piezoelectric vibrating gyros is corrected, so that the rotation velocity of the HMD is always correctly detected.

The amount of direction variation of the HMD can be strictly obtained by integrating the detected angular velocity with respect to time. However, since integrating circuits have complicated structures, in this embodiment, the angular velocity is detected in a cycle of very short time, and assuming that the angular velocity is constant during one cycle, the product of the angular velocity and the cycle time is calculated. The product is used as an approximate amount of direction variation of the HMD. The shorter the cycle of angular velocity detection is, the higher the accuracy of the calculated amount of direction variation amount of the HMD is. In this embodiment, the cycle time for detecting the angular velocity is set to 1 msec and the direction of the HMD is obtained with sufficient accuracy. Since the HMD is provided with the vertical angular velocity sensor 238 and the horizontal angular velocity sensor 239, a rotation of the HMD wearer's head in an arbitrary direction can be detected, so that the direction of the HMD is correctly known.

Figure 13:
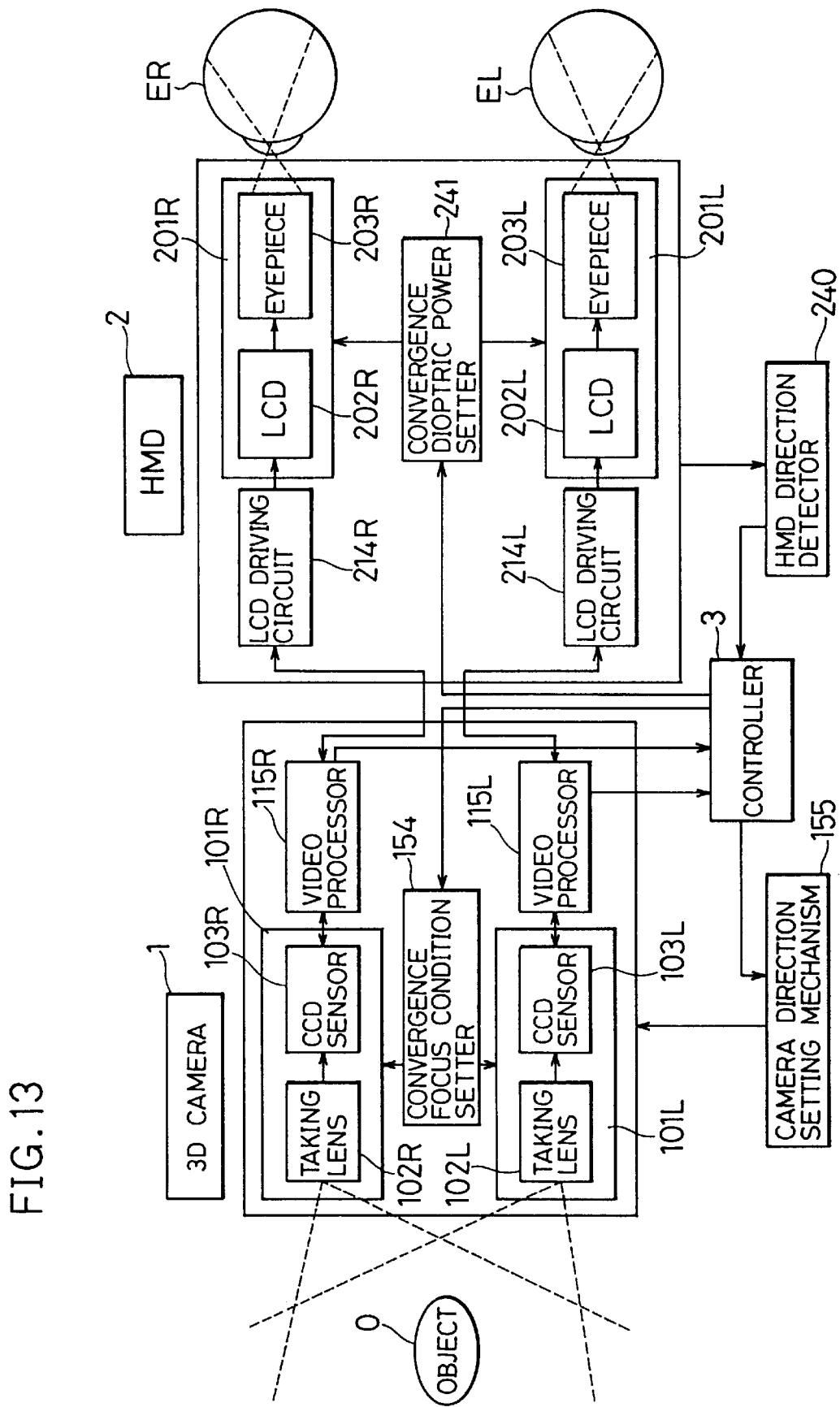
FIG. 13 is a block diagram showing a function of a stereoscopic system.

Referring to FIG. 13, there is shown a block diagram showing a function of the stereoscopic system according to this embodiment. The three-dimensional camera 1 is provided with the left and right cameras 101L and 101R including the taking lenses 102L and 102R and the CCD sensors 103L and 103R. The image of the object O is formed on the CCD sensors 103L and 103R by the taking lenses 102L and 102R. The outputs from the CCD sensors 103L and 103R are transmitted as electric signals to left and right video processors 115L and 115R and processed. The CCD sensors 103L and 103R are driven by driver circuits 113L and 113R included in the video processors 115L and 115R. The signals from the video processors 115L and 115R are transmitted to the HMD 2 and to the controller 3 which controls the three-dimensional camera 1 and the HMD 2.

The HMD 2 is provided with the left and right virtual image projectors 201L and 201R including the display devices 202L and 202R and the eyepieces 203L and 203R, and provides the viewer's left and right eyes EL and ER with the object image taken by the three-dimensional camera 1. As mentioned previously, LCDs which are lightweight and suitable for the HMD are used as the display devices in this embodiment. The video signal of the left camera 101L is inputted to a driver circuit 214L of the display device 202L for the left eye. The video signal of the right camera 101R is inputted to a driver circuit 214R of the display device 202R for the right eye. Based on the signals from the driver circuits 214L and 214R, the object images are displayed on the display devices 202L and 202R. The images displayed on the left and right displays 202L and 202R produce virtual images for the viewer's left and right eyes EL and ER through the eyepieces 203L and 203R. The HMD 2 is provided with a direction detector 240 including the vertical and horizontal angular velocity sensors 238 and 239 to detect the direction of the head of the viewer wearing the HMD 2. The output of the direction detector 240 is transmitted to the controller 3.

At the controller 3, the object distance is detected based on the signals from the left and right video processors 115L and 115R. According to the detected object distance, the controller 3 controls a convergence and focus condition setter 154 of the three-dimensional camera 1 including the pins 109L and 109R, the cam grooves 110L and 110R, the stepping motor 132 and the like to set the convergence and focus condition, and controls a convergence and dioptric power setter 241 of the HMD 2 including the pins 208L, 210L, 208R and 210R and the cam grooves 209L, 211L, 209R and 211R, the stepping motor 232 and the like to set the convergence and dioptric power of the left and right virtual image projectors 201L and 201R. Moreover, according to the output of the direction detector 240 of the HMD 2, the controller 3 controls a camera direction setting mechanism 155 of the three-dimensional camera 1 including the stepping motors 146 and 148 and the like to set the direction of the three-dimensional camera 1, interlocking with the direction of the viewer's head.

While in this embodiment, the distance measurement, the setting of the camera direction, the setting of the convergence and focus condition of the camera and the setting of the convergence and dioptric power of the HMD are performed by the controller 3, controllers for these controls may be incorporated in the three-dimensional camera 1 and the HMD 2, respectively. Moreover, the left and right images taken by the three-dimensional camera and the distance information may be recorded on a video tape or the like so that the reproduced image is viewed through the HMD. In this case, since the convergence and dioptric power of the HMD can be set according to the recorded distance information, a natural stereoscopic image can be viewed at an arbitrary time after the shooting as well as the real time viewing.

Figure 14:
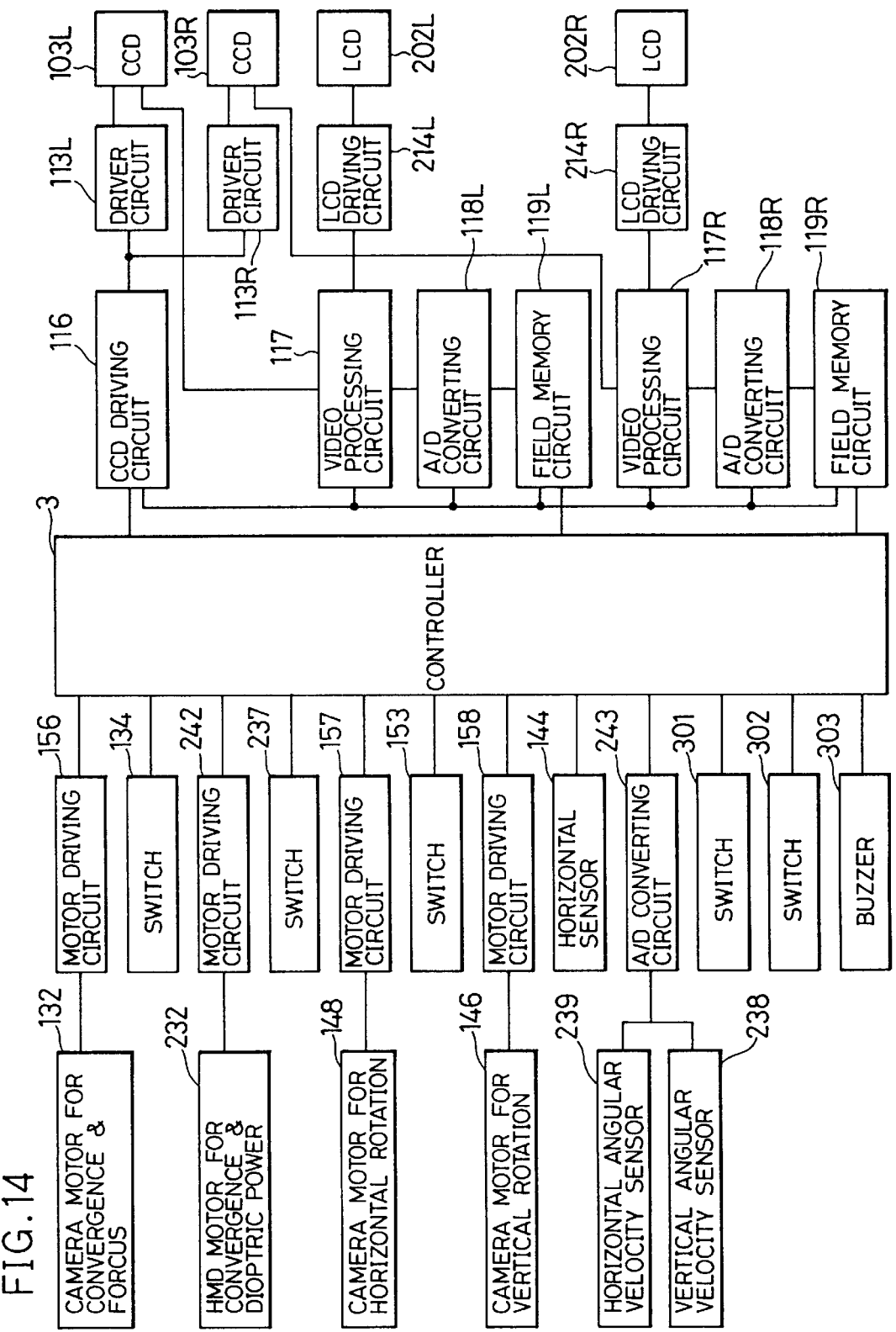
FIG. 14 is a block diagram showing electric circuits of the stereoscopic system.
Figure 15:
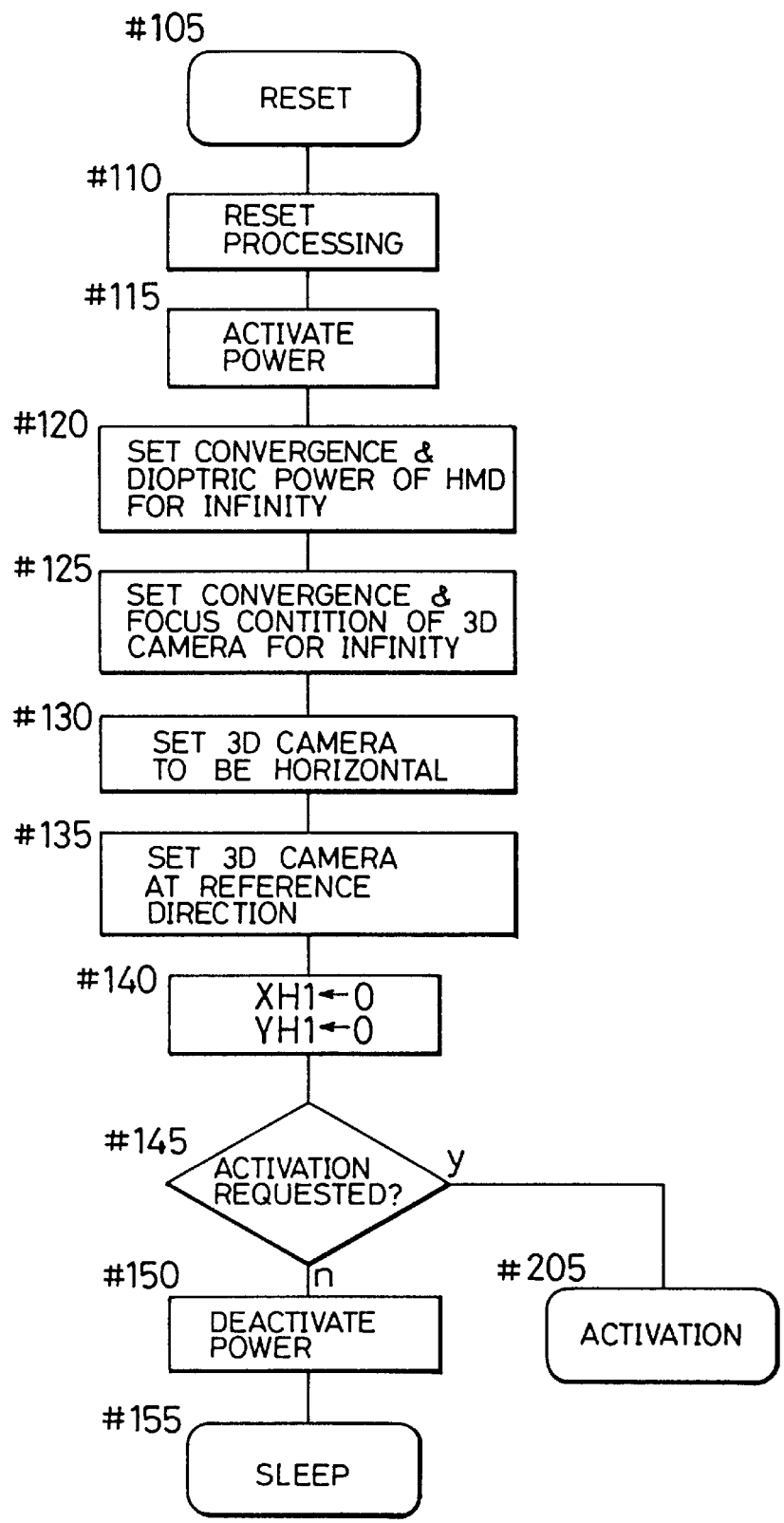
FIG. 15 is a flowchart of a reset routine of the stereoscopic system.

Referring to FIG. 14, there is shown a block diagram of electric circuits of the stereoscopic system according to this embodiment. The three-dimensional camera 1 and the HMD 2 are controlled by the controller 3. The stepping motor 132 which sets the convergence and focus condition of the three-dimensional camera 1 is connected to the controller 3 through a motor driving circuit 156. The switch 134, which is shown in FIG. 3, is closed when the convergence is set for an object at infinity so that the signal is used as a reference for the convergence setting, and controls the driving of the stepping motor 132 so that the optical axes 106L and 106R of the left and right cameras do not incline outward from the parallel condition. The stepping motor 232 which sets the convergence and dioptric power of the HMD 2 is connected to the controller 3 through a motor driving circuit 242. The switch 237, which is shown in FIG. 9, is closed when the left and right optical axes 206L and 206R of the HMD 2 are set to be parallel to each other so that the signal is used as a reference for the convergence setting, and controls the driving of the stepping motor 232 so that the outward inclination of the optical axes 206L and 206R is prevented.

The stepping motor 148 which performs the horizontal rotation of the three-dimensional camera and the switch 153 are shown in FIG. 8. The stepping motor 148 is connected to the controller 3 through a motor driving circuit 157, and the position where the switch 153 is closed is used as a reference position for the rotation. The stepping motor 146 which performs the vertical rotation of the three-dimensional camera is connected to the controller 3 through a motor driving circuit 158. For the vertical rotation, the signal from the horizontal sensor 144 shown in FIG. 6 is used as the reference. The outputs of the horizontal angular velocity sensor 239 and the vertical angular velocity sensor 238 are transmitted by way of an analog-to-digital (A/D) converting circuit 243 to the controller 3 as digital signals.

Reference numeral 301 represents a switch which generates a signal to start the operation of this system. The switch 301 is operated by the viewer wearing the HMD. Reference numeral 302 represents a switch which produces a signal to request the initial setting of the directions of the three-dimensional camera and the HMD. The switch 302 is also operated by the HMD wearer. In addition, a buzzer 303 is provided to send a signal to the HMD wearer in the initial setting. The activating operation and the initial setting of the system will be described later.

The CCD sensors 103L and 103R of the three-dimensional camera are driven by the driver circuits 113L and 113R, respectively. The driver circuits 113L and 113R are connected to a CCD driving circuit 116 which generates the timing for the CCD driving. For this reason, the left and right CCD sensors 103L and 103R are driven at the same timing. The output of the left CCD sensor 103L is processed by a left video processing circuit 117L and transmitted to the left CCD driving circuit 214L. Receiving the video signal from the video processing circuit 117L, the LCD driving circuit 214L displays an image on the LCD 202L serving as the left display device.

The video processing circuit 117L is connected to a field memory circuit 119L through an A/D converting circuit 118L. Video signals for one field are converted into digital values and stored in the field memory circuit 119L. The field memory circuit 119L is connected to the controller 3 so that the digital data are transmitted to the controller 3.

The output of the right CCD sensor 103R is processed in the same manner. Specifically, the signal processed by an video processor 117R is displayed as an image on the LCD 202R through the LCD driving circuit 214R on the one side and is stored in a field memory circuit 119R through an A/D converting circuit 118R on the other side. The video processing circuits 117L and 117R, the A/D converting circuits 118L and 118R and the field memory circuits 119L and 119R are connected to the CCD driving circuit 116 for timing.

Subsequently, control processings of the stereoscopic system according to this embodiment will be described with reference to the flowcharts of FIGS. 15 to 18. After the three-dimensional camera is set with the fixing board horizontal, the power is activated. The controller is arranged to be automatically reset when the power is activated, and starts the processing at step #105 of FIG. 15. At step #110, ports, incorporated random access memories (RAMS) or the like are reset. Then, at step #115, the power to drive the motors, CCDs and LCDs is activated.

Then, the convergences of the HMD and the three-dimensional camera are set for infinity which is the reference position. At step #120, the convergence and dioptric power setting motor 232 of the HMD is driven until the switch 237 is closed to set the convergence and dioptric power of the HMD for infinity. At step #125, the convergence and focus condition setting motor 132 of the three-dimensional camera is driven until the switch 134 is closed to set the convergence and focus condition of the three-dimensional camera for infinity.

Next, the direction of the three-dimensional camera is set to the reference direction. At step #130, the vertical direction driving stepping motor 146 is driven until the horizontal sensor 144 is closed to bring the three-dimensional camera into a condition where it is not rotated in the vertical direction. Thereby, the three-dimensional camera is set to be horizontal. At step #135, the horizontal direction driving stepping motor 148 is driven until the switch 153 is closed to bring the three-dimensional camera into a condition where it is not rotated in the horizontal direction. Thereby, the three-dimensional camera is set to the reference direction and ready to rotate in both left and right directions up to 180°.

Further, the parameters representative of the direction of the viewer's head, i.e. the direction of the HMD are initialized. At step #140, a parameter XH1 representative of the direction in the horizontal direction and a parameter YH1 representative of the direction in the vertical direction are both set to O.

The initialization of the system is completed by the above-described processing. Then, at step #145, whether the activation of the system is requested or not is judged. When the HMD wearer has operated the switch 301 to request the activation, the process proceeds to step #205 of an activation routine to start the activation processing. When the switch 301 is open and the activation is not requested, the power is deactivated at step #150, and at step #155, the system enters a sleep state which is a low power consumption mode, and maintains the state until the activation is requested.

Figure 16:
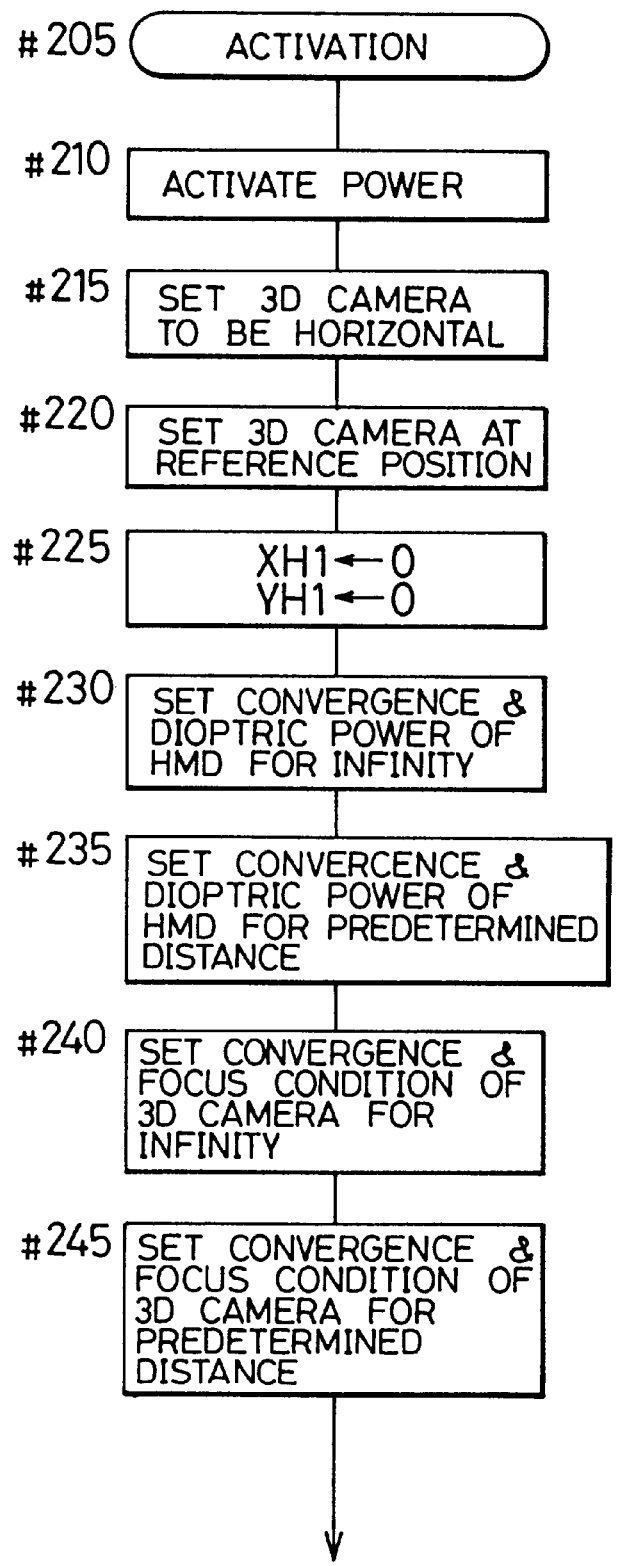
FIG. 16 is a flowchart of an activation routine of the stereoscopic system.
Figure 17:
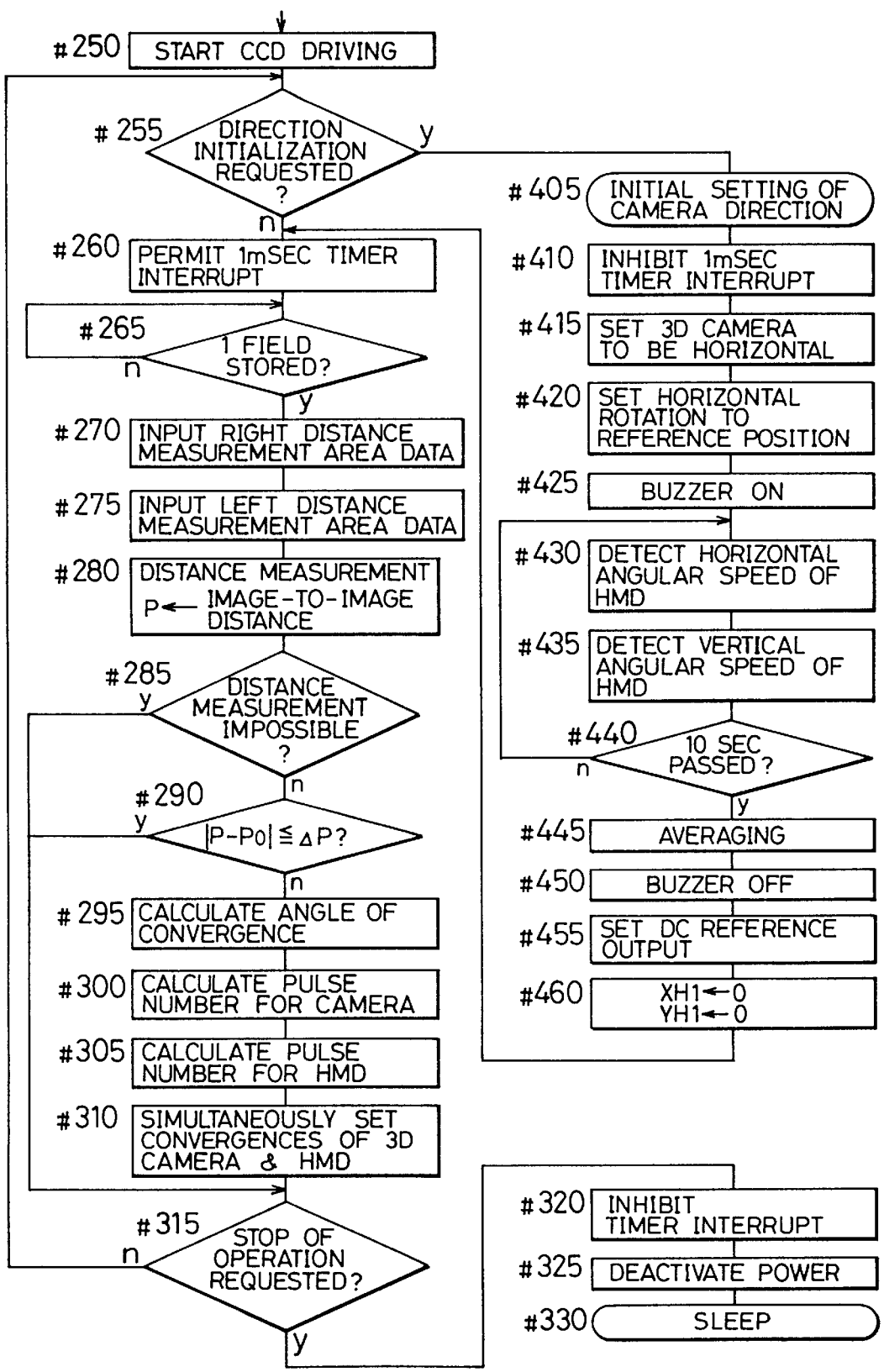
FIG. 17 is a flowchart of the activation routine of the stereoscopic system.

Referring to FIGS. 16 and 17, there is shown the activation processing. First, the power is activated at step #210, and the three-dimensional camera is set at the reference direction at steps #215 and #220. Then, at step #225, the direction parameters XH1 and YH1 of the HMD are initialized to 0. Then, after the convergence and dioptric power of the HMD is once set for infinity at step #230, they are re-set in correspondence with a predetermined distance at step

235. With respect to the convergence and focus condition of the three-dimensional camera, after once set for infinity at step #240, they are re-set to the same predetermined distance as that of the HMD at step #245.

As the predetermined distance, a most typical object distance is selected among the distances of objects viewed using the stereoscopic system. Thereby, the distances of the three-dimensional camera and the HMD are set to distances close to the actual object distance, so that the time required for the setting of the three-dimensional camera and the HMD after the activation is reduced. Consequently, image viewing can be performed immediately after the activation is completed. Since in the above processing the convergence, dioptric power and focus condition are set for the predetermined distance after set for infinity which is the reference position in the above processing, the convergence and focus condition of the three-dimensional camera and the convergence and dioptric power of the HMD are accurately set. Instead of using a most typical object distance, for example, three typical values corresponding to a long distance, a middle distance and a short distance may be stored so that one of them can be arbitrarily selected by a switch operation to set the convergence and focus condition of the three-dimensional camera and the convergence and dioptric power of the HMD.

After the setting of the three-dimensional camera and the HMD is made, the CCD sensors are driven at step #250 to start the shooting by the three-dimensional camera. After the start of the shooting, whether the initialization of directions of the HMD and the three-dimensional camera is requested or not is judged at step #255. The initialization of the directions is requested by an operation of the switch 302 by the HMD wearer.

When the switch 302 is OFF, the initialization is not requested, so that the process proceeds to step #260 to permit a timer interrupt in which the processing to set the direction of the three-dimensional camera is performed every 1 msec. Then, at step #265, whether the video information of the three-dimensional camera is A/D converted and one field of video information is stored or not is judged. When it is not stored, the process repeats the judgement and waits until the storing is completed.

After the storing is completed, digital data of right and left distance measurement areas are inputted to the controller at steps #270 and #275 and the distance measurement is performed by the previously-described method to obtain the distance P between the left and right images at step #280. Next, whether the distance measurement was correctly performed or not is judged at step #285. When the reliability of the distance measurement is low for a reason such as low object contrast, it is judged that the distance measurement is impossible, and the process branches to step #315. When the reliability of the distance measurement is high, the image-to-image distance P is compared with the reference image-to-image distance $P_0$ at step #290 to judge whether the convergence of the three-dimensional camera is appropriately set or not. When the image-to-image distance P coincides with the reference image-to-image distance $P_0$ within a predetermined permissible range $\Delta P$, it is judged that the convergence of the three-dimensional camera is appropriately set and the process proceeds to step #315. When the image-to-image distance P deviates from the reference image-to-image $P_0$ distance and exceeds the permissible range $\Delta P$, it is judged that the convergence of the three-dimensional camera is not appropriately set and the convergences of the three-dimensional camera and the HMD are set in the following manner:

First, the angle of convergence to be set is calculated at step #295. The amount and direction of the deviation between the image-to-image distance P and the reference image-to-image distance $P_0$ are obtained from the absolute value and sign of the difference between the image-to-image distances, and the angle of convergence to be set is calculated based on the angle of convergence having been set at that point of time. Then, the number of driving pulses of the convergence and focus condition setting stepping motor of the three-dimensional camera is obtained at step #300. Since the convergence of the HMD is set in accordance with the convergence of the three-dimensional camera in the stereoscopic system of this embodiment, the number of driving pulses of the convergence and dioptric power setting stepping motor is also obtained at step #305. After that, at step #310, the stepping motors are driven to appropriate directions by the pulse numbers calculated to simultaneously set the convergences of the three-dimensional camera and the HMD.

When the permissible range $\Delta P$ of the image-to-image distance is too large, the convergence setting is judged to be correct even when it is inappropriate, and no re-setting is performed. When the range $\Delta P$ is too small, the convergence setting is performed more frequently than necessary. Therefore, the permissible range $\Delta P$ is set to be large within a range where no problem is caused in the convergence and focus condition setting in the actual shooting and image viewing.

At step #315, the condition of the activation requesting switch 301 is judged. When the switch 301 remains ON, the process returns to #255 to continue the control process. When the switch 301 is OFF, it is requested to stop the operation of the system, so that after the timer interrupt is inhibited at step #320 and the power is deactivated at step #325, the process enters the sleep state at step #330.

When it is judged at step #255 that the initialization of the direction is requested, the process branches to step #405 to initialize the direction of the three-dimensional camera and the direction of the HMD. This is for squaring the direction of the three-dimensional camera with the direction of the HMD wearer's head in starting the use of the stereoscopic system and for re-squaring the directions of the three-dimensional camera and the HMD when they disagree with each other due to a long time continuous use of the system or a change in posture of the HMD wearer.

First, a 1 msec timer interrupt for setting the direction of the three-dimensional camera is inhibited at step #410. Then, the three-dimensional camera is set to be horizontal at step #415 and the horizontal rotation is returned to the reference position at step #420. Next, the buzzer is turned on at step #425 to notify the HMD wearer that the three-dimensional camera is set to the reference direction. The HMD wearer should look straight ahead and be careful not to move his or her head. Under this condition, the velocity of the horizontal rotation of the HMD is detected at step #430, and the velocity of the vertical rotation is detected at step #435. The detection of rotation velocity of the HMD under the stationary condition is continued for 10 seconds. When it is judged that 10 seconds have passed at step #440, the horizontal and vertical rotation velocity is averaged, respectively, at step #445. The buzzer is turned off at step #450, and the HMD wearer is released from the condition where his or her head should be stationary.

The human head slightly vibrates even when it is kept stationary and the average of the angular velocity in the horizontal and vertical directions is obtained in the above-described manner. The average values thus obtained can be regarded as substantial outputs of the angular velocity sensors when the HMD wearer's head is stationary. At step #455, these values are set to the DC reference outputs of the piezoelectric vibrating gyros serving as the angular velocity sensors. Then, at step #460, the direction parameters XH1 and YH1 of the HMD are initialized to O and the process proceeds to the above-described step #260.

Figure 18:
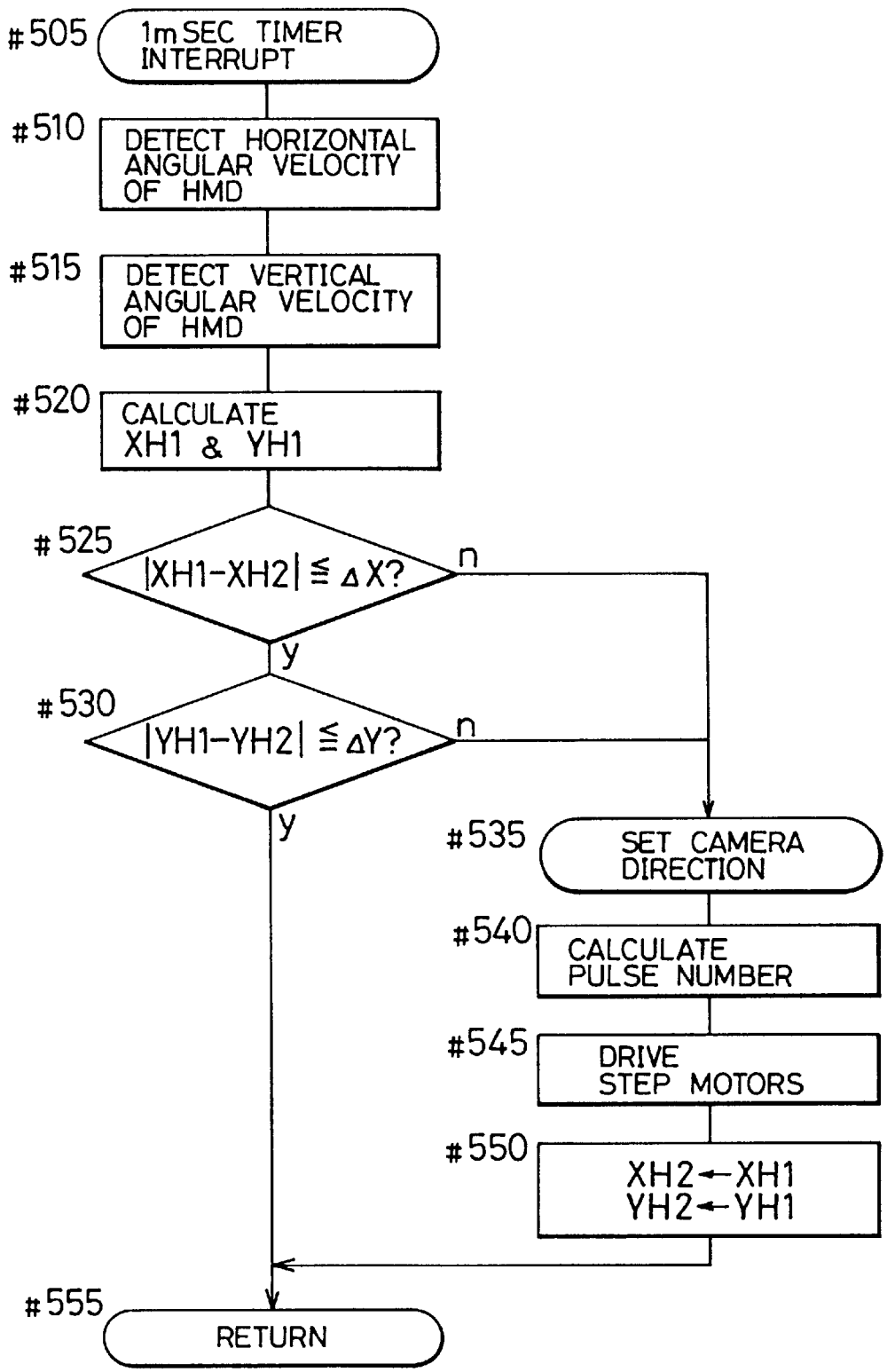
FIG. 18 is a flowchart of an interrupt routine of the stereoscopic system.

Referring to FIG. 18, there is shown the 1 msec timer interrupt processing for squaring the direction of the three-dimensional camera with the direction of the HMD. In this stereoscopic system, the control process proceeds to step #505 in a cycle of 1 msec to perform the following processing. First, the velocity of horizontal rotation of the HMD is detected by the horizontal angular velocity sensor at step #510 and the velocity of vertical rotation of the HMD is detected by the vertical angular velocity sensor at step #515. Next, the horizontal direction XH1 and the vertical direction YH1 are calculated at step #520. Specifically, these are calculated according to the following two expressions:

$$XH1 = XH1 + (XAS - XAD) \cdot ka$$

$$YH1 = YH1 + (YAS - YAD) \cdot ka$$

Here, XAS is the velocity of horizontal rotation detected at this time and XAD is the velocity of horizontal rotation obtained at step #445 when the head is stationary, i.e. the DC reference output in the horizontal direction. Likewise, YAS is the velocity of vertical rotation detected at this time and YAD is the velocity of vertical rotation obtained when the head is stationary, i.e. the DC reference output in the vertical direction. ka is a constant to convert the voltage representative of the angular velocity into the angle. The first terms XH1 and YH1 on the right sides are horizontal and vertical directions having been set at the last time, respectively, and the second terms (XAS−XAD)·ka and (YAS−YAD)·ka are horizontal and vertical variation amounts of angles from the last time to this time.

Next, the directions XH1 and YH1 of the HMD thus obtained and directions XH2 and YH2 having been set for the three-dimensional camera are compared and the direction of the camera is set when necessary. At step #525, whether the absolute value of the difference between the horizontal direction XH1 of the HMD and the horizontal direction XH2 of the three-dimensional camera is within a permissible range ΔX or not is judged. When it exceeds the permissible range ΔX, the process branches to step #535. When it is within the permissible range ΔX, the process proceeds to step #530 to compare the vertical directions. When the absolute value of the difference between the vertical direction YH1 of the HMD and the vertical direction YH2 of the three-dimensional camera exceeds a permissible range ΔY, the process proceeds to step #535. When it is within the permissible range ΔY, since the directions of the HMD and the three-dimensional camera coincide in both the horizontal and vertical directions, the interrupt processing is ended at step #555.

When it is judged at steps #525 and #530 that the directions of the HMD and the three-dimensional camera deviate from each other by an amount exceeding the permissible range in at least one of the horizontal and vertical directions, the process proceeds to step #535 to square the direction of the three-dimensional camera with the direction of the HMD. At step #540, the numbers of driving pulses for the stepping motor for setting the horizontal direction of the three-dimensional camera and for the stepping motor for setting the vertical direction thereof are calculated, and at step #545, these stepping motors are driven to set the directions of the three-dimensional camera. At step #550, the parameters XH2 and YH2 representative of the directions of the three-dimensional camera are replaced by the parameters XH1 and YH1 representative of the direction of the HMD. Then, the interrupt processing is ended at step #555 to restore the processing having been performed before the interrupt.

The permissible ranges ΔX and ΔY of the deviation between the direction of the HMD and the direction of the three-dimensional camera are each set to a level such that the viewer does not feel uncomfortable even if the three-dimensional camera does not follow the movement of his or her head. The permissible range ΔX of the horizontal direction and the permissible range ΔY of the vertical direction may be the same or may be different.

By the above interrupt processing, the direction of the HMD wearer's head is sensed in a cycle of 1 msec, and when the deviation from the direction of the three-dimensional camera exceeds a predetermined value, the direction of the three-dimensional camera is set to coincide with the direction of the HMD wearer's head. Since the direction of the three-dimensional camera is not changed when the deviation is within the predetermined value, no unnecessary fine direction setting of the three-dimensional camera is made in response to unintended fine movements of the head. Therefore, a stable stereoscopic image without any incongruity can be provided to the viewer wearing the HMD.

In the stereoscopic system of this embodiment thus structured and controlled, since the direction of the three-dimensional camera for shooting interlocks with the direction of the HMD for display, the object desired by the viewer can be automatically shot and displayed. In addition, the convergence and focus condition of the three-dimensional camera and the convergence and dioptric power of the HMD are appropriately and automatically set in accordance with the distance from the three-dimensional camera to the object.

Obviously, many modifications and variations of the present invention are possible in light of the above teachings. It is therefore to be understood that within the scope of the appended claims, the invention may be practiced other than as specifically described.

What is claimed is:

1. A stereoscopic system including:
    a shooting apparatus provided with left and right cameras each having a taking lens and an image sensing device which receives light transmitted by the taking lens; and
    a video display apparatus provided with left and right video display devices and left and right eyepieces, wherein images taken by the left and right cameras are viewed by being displayed on the left and right video display devices of the video display apparatus, said stereoscopic system comprising:
    a first convergence setter which sets a convergence between the left and right cameras of the shooting apparatus;
    a second convergence setter which sets a convergence of the video display apparatus;
    a focusing apparatus which performs focusing of the taking lenses of the left and right cameras of the shooting apparatus, interlocking with the convergence setting by the first convergence setter;
    an actuator which supplies a driving force to both the first convergence setter and the focusing apparatus;
    a distance detector which obtains information on a distance to an object to be shot; and a controller which controls said first and second convergence setters based on the information obtained by said distance detector, wherein said focusing apparatus includes a pin located in a cam grove, at least one of said pin and said cam groove being moveable with respect to the other to perform focusing.

2. A stereoscopic system as claimed in claim 1, wherein said video display apparatus has a dioptric power adjuster which adjusts a dioptric power, interlocking with the convergence setting by the second convergence setter.

3. A stereoscopic system as claimed in claim 2, wherein another actuator is included which supplies a driving force to both the second convergence setter and the dioptric power adjuster.

4. A stereoscopic system as claimed in claim 1, wherein said first convergence setter sets a convergence between the left and right cameras of the shooting apparatus by adjusting an angle between the optical axes of said cameras.

5. A stereoscopic system as claimed in claim 1, wherein said distance detector detects the distance to the object to be shot based on information obtained from the image taken by the shooting apparatus.

6. A video display apparatus provided with left and right optical systems including a video display device and an eye-piece, comprising:

a convergence setter which sets convergences of the left and right optical systems;

a dioptric power adjuster which sets dioptric power of the left and right optical systems by varying distances between the video display devices and the eyepieces; and a controller which drives the convergence setter and the dioptric power adjuster so as to interlock with each other to control the convergence setting and the dioptric power setting.

7. A video display apparatus according to claim 6, wherein said convergence setting and dioptric power setting of the left and right optical systems are performed symmetrically.

8. A video display apparatus according to claim 6, wherein said controller sets the convergence and dioptric power based on information on an image to be displayed.

9. A video display apparatus according to claim 8, wherein said controller calculates a distance to an object in the image to be displayed based on the image and sets the convergence and dioptric power based on the calculated distance.

10. A video display apparatus according to claim 6, wherein said convergence setter sets the convergence by rotating the directions of the optical axes of the left and right optical systems.

11. A video display apparatus according to claim 6, wherein the convergence setting and the dioptric power setting are interlocked mechanically with each other.

12. A stereoscopic system including a shooting apparatus provided with left and right cameras each having a taking lens and an image sensing device which receives light transmitted by the taking lens; and a video display apparatus provided with left and right video display devices and left and right eyepieces, wherein images taken by the left and right cameras are viewed by being displayed on the left and right video display devices of the video display apparatus, said stereoscopic system comprising:

a first convergence setter which sets a convergence of the shooting apparatus;

a second convergence setter which sets a convergence of the video display apparatus;

a dioptric power adjuster which adjusts a dioptric power of the video display apparatus in an interlocking manner with said second convergence setter;

a distance detector which obtains information on a distance to an object to be shot; and a controller which controls said first and second convergence setters based on the information obtained by said distance detector.

* * * * *